United States Patent
Shkolnik et al.

(10) Patent No.: US 9,528,435 B2
(45) Date of Patent: Dec. 27, 2016

(54) AIR-COOLED ROTARY ENGINE

(71) Applicant: LiquidPiston, Inc., Bloomfield, CT (US)

(72) Inventors: Nikolay Shkolnik, West Hartford, CT (US); Alexander C. Shkolnik, Cambridge, MA (US); Alex Lyubomirskiy, Stoughton, MA (US)

(73) Assignee: LiquidPiston, Inc., Bloomfield, CT (US)

( * ) Notice: Subject to any disclaimer, the term of this patent is extended or adjusted under 35 U.S.C. 154(b) by 0 days.

(21) Appl. No.: 14/163,654

(22) Filed: Jan. 24, 2014

(65) Prior Publication Data

US 2014/0209056 A1    Jul. 31, 2014

Related U.S. Application Data

(60) Provisional application No. 61/757,078, filed on Jan. 25, 2013, provisional application No. 61/765,339, filed on Feb. 15, 2013, provisional application No. 61/873,182, filed on Sep. 3, 2013.

(51) Int. Cl.
| | |
|---|---|
| *F02B 55/06* | (2006.01) |
| *F01C 1/10* | (2006.01) |
| *F01C 21/06* | (2006.01) |
| *F01C 21/08* | (2006.01) |

(52) U.S. Cl.
CPC ............. *F02B 55/06* (2013.01); *F01C 1/104* (2013.01); *F01C 21/06* (2013.01); *F01C 21/08* (2013.01); *F04C 2240/807* (2013.01)

(58) Field of Classification Search
CPC ..... F02B 55/06; F02B 2053/005; F02B 53/00; F02B 53/04; F02B 55/12; F02B 55/04; F01C 21/08; F01C 1/104; F01C 21/06; F04C 2240/807
USPC ....... 123/241, 242, 212, 229, 235; 418/61.2, 418/61.3, 91, 97, 101, 187
See application file for complete search history.

(56) References Cited

U.S. PATENT DOCUMENTS

| | | | |
|---|---|---|---|
| 748,348 | A | 12/1903 | Cooley |
| 813,018 | A | 2/1906 | Okun |
| 939,751 | A | 11/1909 | Schulz |
| 1,061,206 | A | 5/1913 | Tesla |
| 1,144,921 | A | 6/1915 | Stever |
| 1,225,056 | A | 5/1917 | Riggs et al. |

(Continued)

FOREIGN PATENT DOCUMENTS

| | | |
|---|---|---|
| AU | 199897511 | 5/1999 |
| DE | 24 38 410 | 2/1976 |

(Continued)

OTHER PUBLICATIONS

Veselovsky, Veselovsky Rotary-Piston Engine, published at http://www.econologie.info/share/partager2/1296649576M5q2Sb.pdf, dated Jan. 2, 2011.

(Continued)

*Primary Examiner* — Kenneth Bomberg
*Assistant Examiner* — Jason T Newton
(74) *Attorney, Agent, or Firm* — Sunstein Kann Murphy & Timbers LLP

(57) ABSTRACT

An internal combustion rotary engine includes an air passage configured to allow cool air to flow through the rotor as the rotor moves relative to the housing within the engine. Some embodiments include a removable fuel cartridge.

15 Claims, 18 Drawing Sheets

(56) References Cited

U.S. PATENT DOCUMENTS

| | | | |
|---|---|---|---|
| 1,329,559 A | 2/1920 | Telsa | |
| 1,406,140 A | 2/1922 | Anderson | |
| 1,434,446 A | 11/1922 | McQueen | |
| 2,091,411 A | 8/1937 | Mallory | |
| 2,175,265 A | 10/1939 | Johnson | |
| 2,344,496 A | 3/1944 | Conradt | |
| 2,366,213 A * | 1/1945 | Pover | 418/245 |
| 2,547,374 A | 4/1951 | Carideo | |
| 2,762,346 A | 9/1956 | White | |
| 2,766,737 A | 10/1956 | Sprinzing | |
| 2,099,065 A | 6/1961 | Wankel et al. | 123/8 |
| 2,988,008 A | 6/1961 | Wankel | 103/121 |
| 2,997,848 A | 8/1961 | Snyder | |
| 3,010,440 A | 11/1961 | Roth | |
| 3,026,811 A | 3/1962 | Van Beuning | |
| 3,064,880 A | 11/1962 | Wankel et al. | |
| 3,098,605 A | 7/1963 | Bentele et al. | |
| 3,102,682 A | 9/1963 | Paschke | |
| 3,120,921 A | 2/1964 | Hovorka | |
| 3,139,233 A | 6/1964 | Simonsen | |
| 3,148,671 A | 9/1964 | Bottorff et al. | |
| 3,200,794 A * | 8/1965 | Peras | 123/242 |
| 3,206,109 A | 9/1965 | Paschke | |
| 3,215,129 A | 11/1965 | Johnson | |
| 3,220,388 A | 11/1965 | Trotter | |
| 3,224,421 A * | 12/1965 | Peras | 123/242 |
| 3,228,183 A | 1/1966 | Feller | |
| 3,234,922 A | 2/1966 | Froede | |
| 3,244,157 A | 4/1966 | Tanferna et al. | |
| 3,245,388 A * | 4/1966 | Froede et al. | 123/205 |
| 3,297,005 A * | 1/1967 | Lamm | 123/218 |
| 3,299,862 A * | 1/1967 | Peras | 418/91 |
| 3,299,863 A * | 1/1967 | de Coye de Castelet | 418/91 |
| 3,315,648 A | 4/1967 | Del Castillo | |
| 3,316,887 A | 5/1967 | Melvin | |
| 3,371,654 A | 3/1968 | Garside | |
| 3,408,991 A | 11/1968 | Davis | |
| 3,422,801 A | 1/1969 | Mido | |
| 3,452,723 A | 7/1969 | Keylwert | |
| 3,503,374 A | 3/1970 | Ehrlich et al. | |
| 3,508,530 A | 4/1970 | Clawson | |
| 3,587,547 A | 6/1971 | Hussey et al. | |
| 3,595,014 A | 7/1971 | McMaster | |
| 3,658,447 A | 4/1972 | Bancroft | |
| 3,687,117 A | 8/1972 | Panariti | |
| 3,688,749 A | 9/1972 | Wankel | |
| 3,692,002 A | 9/1972 | Williams | |
| 3,732,689 A | 5/1973 | Tado et al. | |
| 3,754,534 A | 8/1973 | Burley | |
| 3,760,777 A * | 9/1973 | Leroy | F01C 1/104 123/234 |
| 3,769,788 A | 11/1973 | Korper, III | |
| 3,782,337 A | 1/1974 | Feller | |
| 3,795,227 A | 3/1974 | Jones | |
| 3,797,464 A | 3/1974 | Abbey | |
| 3,809,024 A | 5/1974 | Abbey | |
| 3,815,555 A | 6/1974 | Tubeuf | |
| 3,815,561 A | 6/1974 | Seitz | |
| 3,844,117 A | 10/1974 | Ryan | |
| 3,845,562 A | 11/1974 | Dallas | |
| 3,845,745 A | 11/1974 | Dunlap et al. | |
| 3,851,999 A | 12/1974 | Bibbens | |
| 3,854,999 A | 12/1974 | Thornton | |
| 3,855,972 A | 12/1974 | Roberts | |
| 3,872,838 A * | 3/1975 | Vogelsang et al. | 418/187 |
| 3,872,839 A | 3/1975 | Russell et al. | |
| 3,885,799 A | 5/1975 | Bibbens | |
| 3,899,875 A | 8/1975 | Oklejas et al. | |
| 3,921,596 A | 11/1975 | Schulz | |
| 3,924,576 A | 12/1975 | Siewert | |
| 3,929,105 A | 12/1975 | Chisholm | |
| 3,930,767 A | 1/1976 | Hart | |
| 3,980,052 A | 9/1976 | Noguchi et al. | |
| 3,980,064 A | 9/1976 | Ariga et al. | |
| 3,985,476 A * | 10/1976 | Hofbauer | 418/61.3 |
| 3,989,011 A | 11/1976 | Takahashi | |
| 3,998,049 A | 12/1976 | McKinley et al. | |
| 3,998,572 A | 12/1976 | Warrick | |
| 4,047,856 A | 9/1977 | Hoffman | |
| 4,059,068 A | 11/1977 | Guillermin et al. | |
| 4,060,352 A | 11/1977 | Woodier et al. | |
| 4,068,986 A | 1/1978 | Todorovic | |
| 4,080,935 A | 3/1978 | Olson | |
| 4,083,446 A | 4/1978 | Schuchman, Sr. | |
| 4,083,663 A * | 4/1978 | Montalvo | 418/183 |
| 4,116,593 A | 9/1978 | Jones | |
| RE29,978 E | 5/1979 | Leshner et al. | |
| 4,178,900 A | 12/1979 | Larson | |
| 4,187,062 A * | 2/1980 | Traut | 418/61.3 |
| 4,219,315 A | 8/1980 | Sarich | |
| 4,297,090 A | 10/1981 | Hoffman | |
| 4,319,867 A | 3/1982 | Koshelev et al. | |
| 4,381,745 A | 5/1983 | Firey | |
| 4,399,863 A | 8/1983 | Banasiuk | |
| 4,401,070 A | 8/1983 | McCann | |
| 4,423,710 A | 1/1984 | Williams | |
| 4,446,829 A | 5/1984 | Yeager | |
| 4,553,513 A | 11/1985 | Miles et al. | |
| 4,712,516 A * | 12/1987 | Eberhardt | 123/1 A |
| 4,741,164 A | 5/1988 | Slaughter | |
| 4,817,567 A | 4/1989 | Wilks | |
| 4,898,522 A * | 2/1990 | Edelmayer | 418/61.2 |
| 4,900,333 A | 2/1990 | Bos | |
| 4,996,965 A | 3/1991 | Onari et al. | |
| 5,072,589 A | 12/1991 | Schmitz | |
| 5,127,369 A | 7/1992 | Goldshtik | |
| 5,228,414 A | 7/1993 | Crawford | |
| 5,373,819 A | 12/1994 | Linder | |
| 5,501,162 A | 3/1996 | Kravets | |
| 5,595,059 A | 1/1997 | Huber et al. | |
| 5,622,149 A | 4/1997 | Wittry | |
| 5,623,894 A | 4/1997 | Clarke | |
| 5,647,308 A | 7/1997 | Biagini | |
| 5,711,268 A | 1/1998 | Holdampf | |
| 5,755,100 A | 5/1998 | Lamos | |
| 5,755,197 A | 5/1998 | Oplt | |
| 5,799,636 A | 9/1998 | Fish | |
| 5,950,579 A | 9/1999 | Ott | |
| 5,992,356 A | 11/1999 | Howell-Smith | |
| 6,058,901 A | 5/2000 | Lee | |
| 6,058,912 A | 5/2000 | Rembold et al. | |
| 6,112,522 A | 9/2000 | Wright | |
| 6,202,416 B1 | 3/2001 | Gray, Jr. | |
| 6,230,671 B1 | 5/2001 | Achterberg | |
| 6,318,309 B1 | 11/2001 | Burrahm et al. | |
| 6,347,611 B1 | 2/2002 | Wright | |
| 6,397,579 B1 | 6/2002 | Negre | |
| 6,575,719 B2 * | 6/2003 | Manner et al. | 418/61.2 |
| 6,609,371 B2 | 8/2003 | Scuderi | |
| 6,668,769 B1 | 12/2003 | Palazzolo | |
| 6,722,127 B2 | 4/2004 | Scuderi et al. | |
| 6,752,104 B2 | 6/2004 | Fiveland et al. | |
| 6,752,133 B2 | 6/2004 | Arnell | |
| 6,792,966 B2 | 9/2004 | Harvey | |
| 6,955,153 B1 | 10/2005 | Peitzke et al. | |
| 7,117,839 B2 | 10/2006 | Horstin | |
| 7,191,738 B2 | 3/2007 | Shkolnik | |
| 7,520,738 B2 * | 4/2009 | Katz | 418/150 |
| 7,549,850 B2 | 6/2009 | Trapalis | |
| 7,757,658 B2 | 7/2010 | Nagata et al. | |
| 7,793,635 B2 | 9/2010 | Okamura | |
| 7,909,013 B2 | 3/2011 | Shkolnik et al. | |
| 8,312,859 B2 | 11/2012 | Rom et al. | |
| 8,365,698 B2 | 2/2013 | Shkolnik et al. | |
| 8,365,699 B2 | 2/2013 | Shkolnik et al. | |
| 8,523,546 B2 | 9/2013 | Shkolnik et al. | |
| 2002/0007813 A1 | 1/2002 | Shigemori | |
| 2002/0007815 A1 | 1/2002 | Oh et al. | |
| 2002/0182054 A1 | 12/2002 | Entrican, Jr. | |
| 2005/0166869 A1 | 8/2005 | Shkolnik | |
| 2008/0202486 A1 | 8/2008 | Shkolnik et al. | |
| 2010/0313844 A1 * | 12/2010 | Garside | 123/244 |
| 2011/0023814 A1 | 2/2011 | Shkolnik et al. | |

(56) References Cited

U.S. PATENT DOCUMENTS

| | | | |
|---|---|---|---|
| 2011/0259002 A1* | 10/2011 | Hanson | 60/519 |
| 2012/0294747 A1* | 11/2012 | Shkolnik et al. | 418/51 |
| 2015/0315913 A1* | 11/2015 | Peter | F01C 1/103 |
| | | | 418/61.3 |

FOREIGN PATENT DOCUMENTS

| | | | | |
|---|---|---|---|---|
| DE | 3242505 | | 5/1984 | |
| DE | 3705313 | | 10/1987 | |
| DE | 41 40 316 | | 6/1993 | |
| DE | 4239927 | | 6/1994 | |
| DE | 4305669 | | 8/1994 | |
| DE | 44 32 688 | | 3/1995 | |
| DE | 102004012962 A1 | * | 9/2004 | F01C 1/104 |
| EP | 345055 | | 12/1989 | |
| FR | 1 153 857 | | 3/1958 | |
| FR | 2239895 A5 | * | 2/1975 | F01C 1/104 |
| FR | 2254980 A5 | * | 7/1975 | F01C 1/104 |
| GB | 1046504 A | * | 10/1966 | F01C 1/104 |
| GB | 1 313 842 | | 4/1973 | |
| GB | 2 402 974 | | 12/2004 | |
| JP | 52118112 | | 10/1977 | |
| JP | 56-126601 | | 10/1981 | |
| JP | 59-079002 | | 5/1984 | |
| JP | 3-501638 | | 4/1991 | |
| JP | 06-001741 | | 1/1994 | |
| JP | 06-323159 | | 11/1994 | |
| JP | 8-100668 | | 4/1996 | |
| JP | 9-502780 | | 3/1997 | |
| JP | 2000-130101 | | 5/2000 | |
| JP | 2001-521094 | | 11/2001 | |
| RU | 2078221 | | 4/1997 | |
| WO | WO 90/02259 | | 3/1990 | |
| WO | WO 95/08055 | | 3/1995 | |
| WO | WO 96/12870 | | 5/1996 | |
| WO | WO 98/10172 | | 3/1998 | |
| WO | WO 00/22286 | | 4/2000 | |
| WO | WO 03/074840 | | 9/2003 | |
| WO | WO 2005/071230 | | 8/2005 | |
| WO | WO 2010/017199 | | 2/2010 | |
| WO | WO 2012/135556 A2 | | 10/2012 | F01C 19/00 |

OTHER PUBLICATIONS

International Searching Authority, International Preliminary Report on Patentability—International Application No. PCT/US2005/000932, together with the Written Opinion of the International Searching Authority, dated Jul. 17, 2006.

International Searching Authority, Notification of Transmittal of the International Search Report, and the Written Opinion of the International Searching Authority, or the Declaration—International Application No. PCT/US2009/052708, dated Jul. 28, 2010, 3 pages.

International Searching Authority, International Search Report—International Application No. PCT/US2009/052708, together with the Written Opinion of the International Searching Authority, dated Jul. 28, 2010, 12 pages.

International Searching Authority, Notification of Transmittal of the International Search Report and the Written Opinion of the International Searching Authority, or the Declaration—International Application No. PCT/US2012/031324, dated Aug. 16, 2013, 17 pages.

Authorized Officer S. Bocage, International Search Report—International Application No.PCT/US2014/013015, dated Jul. 8, 2014, together with the Written Opinion of the International Searching Authority, 15 pages.

* cited by examiner

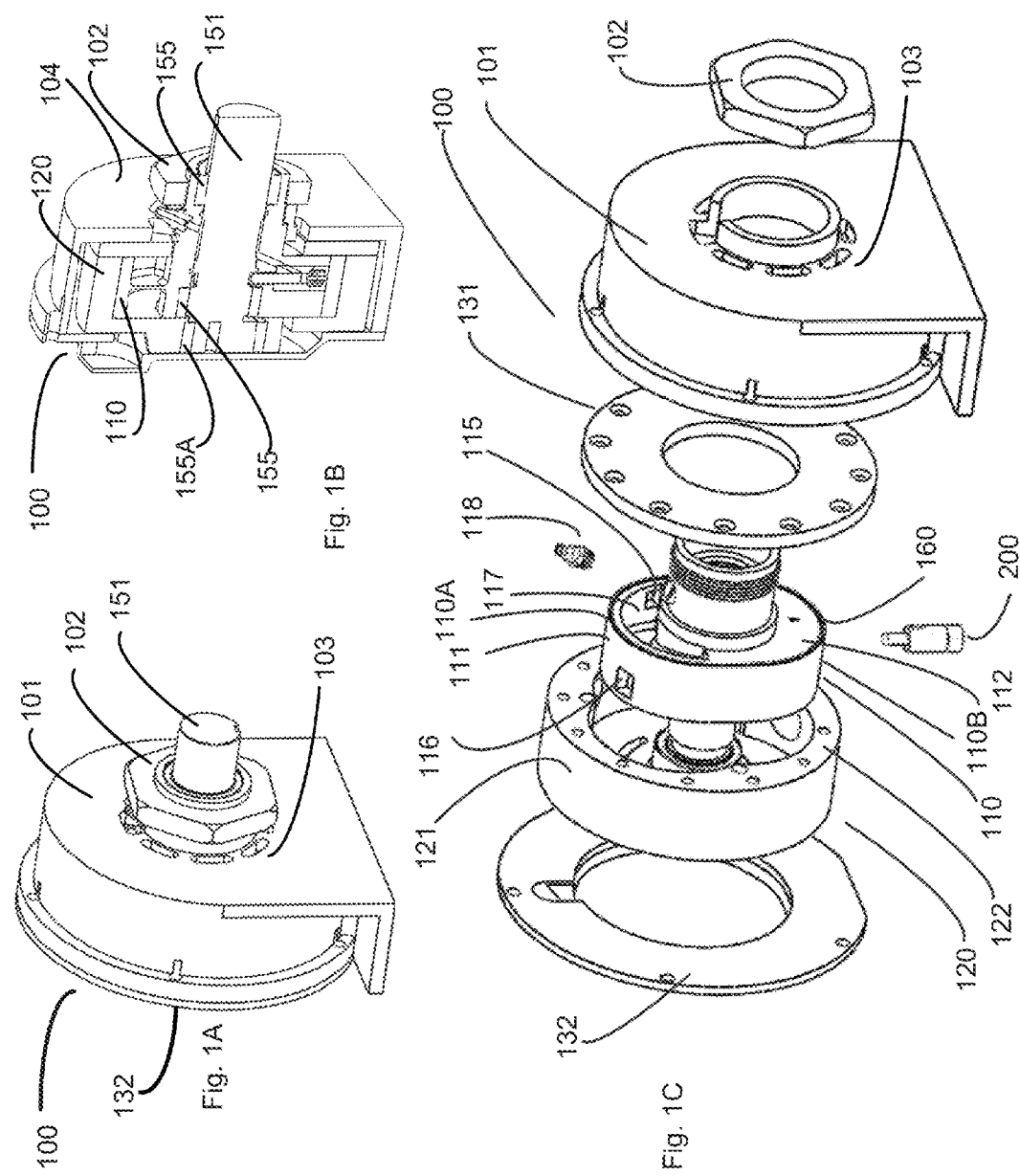

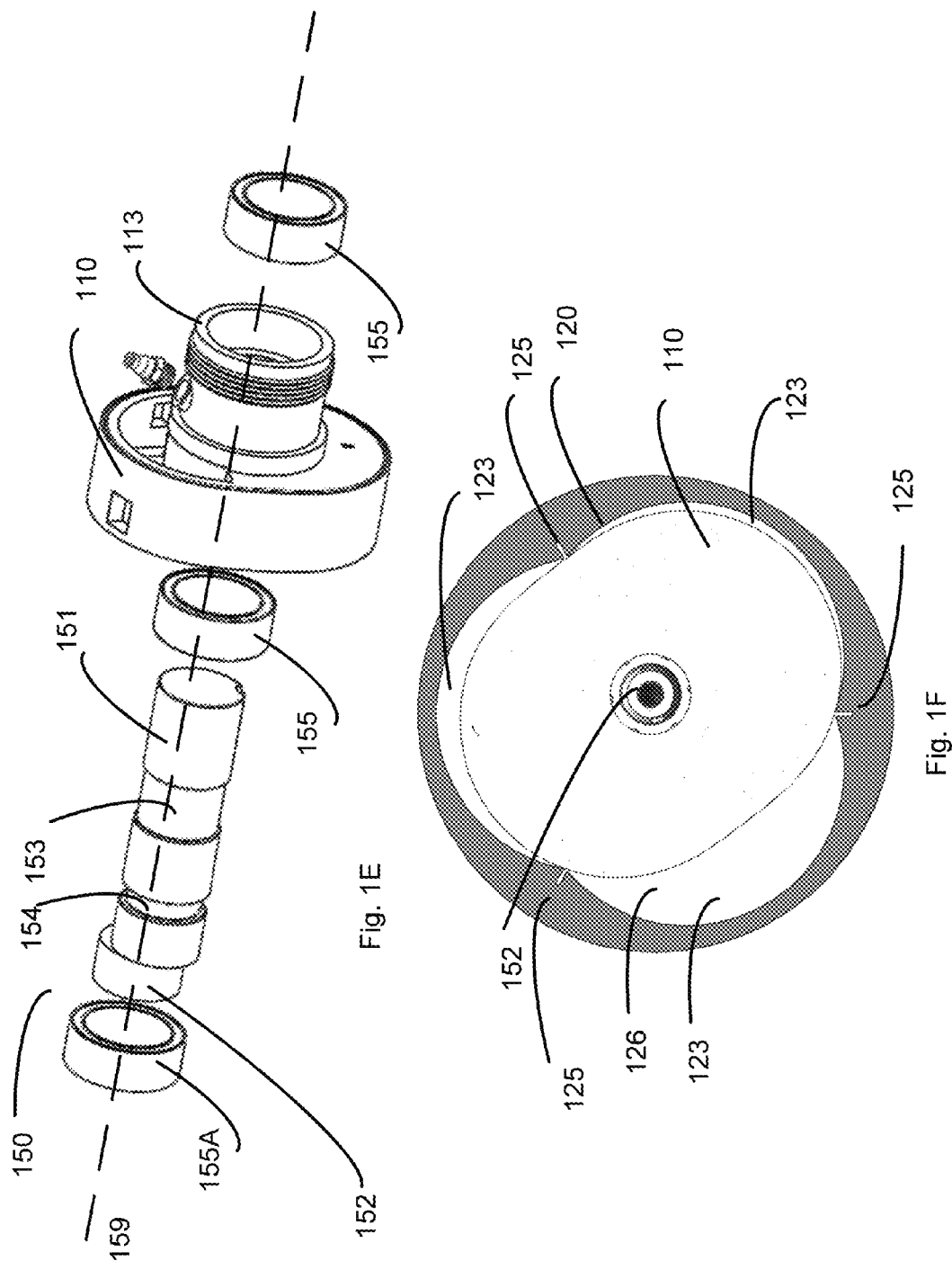

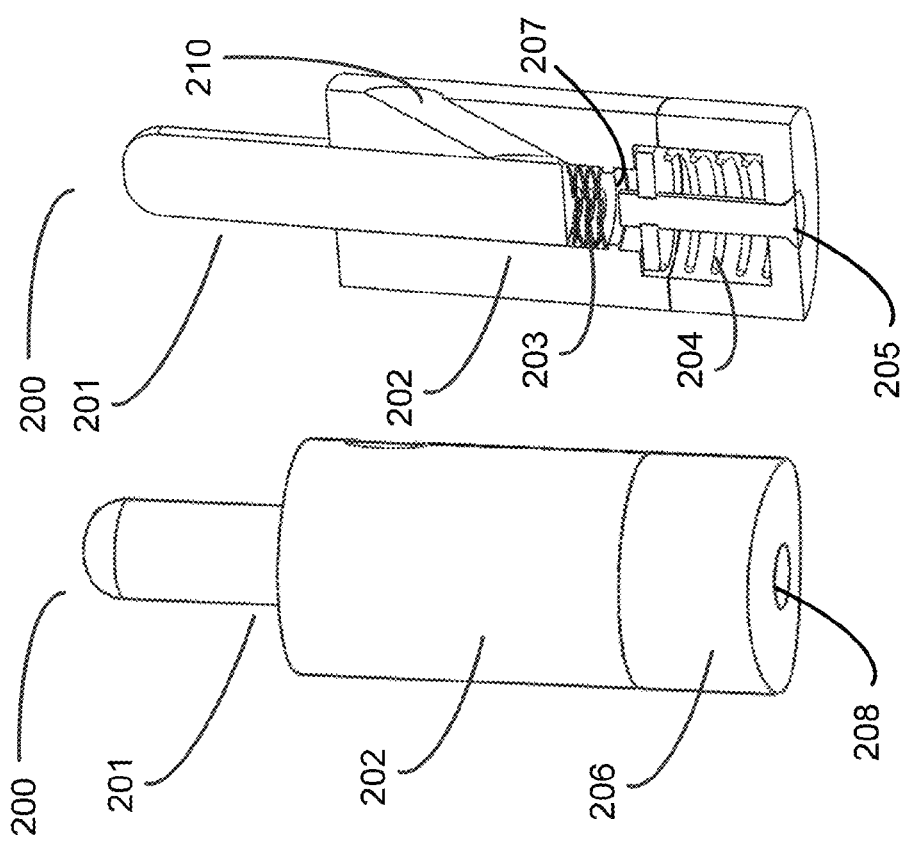
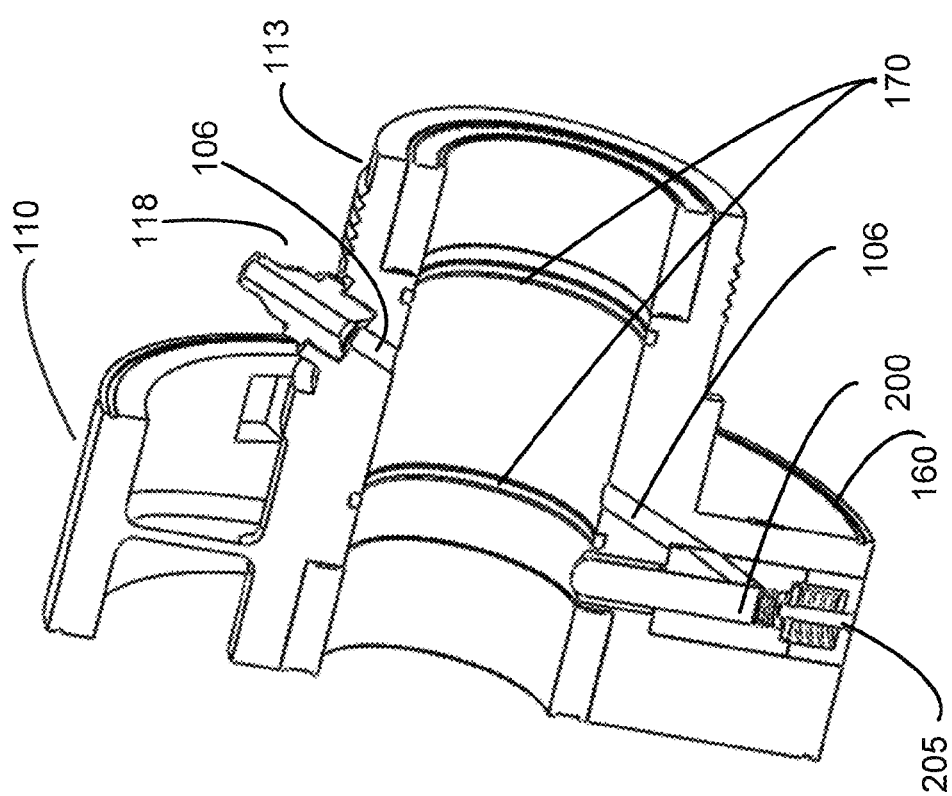
Fig. 2B
Fig. 2A
Fig. 1G

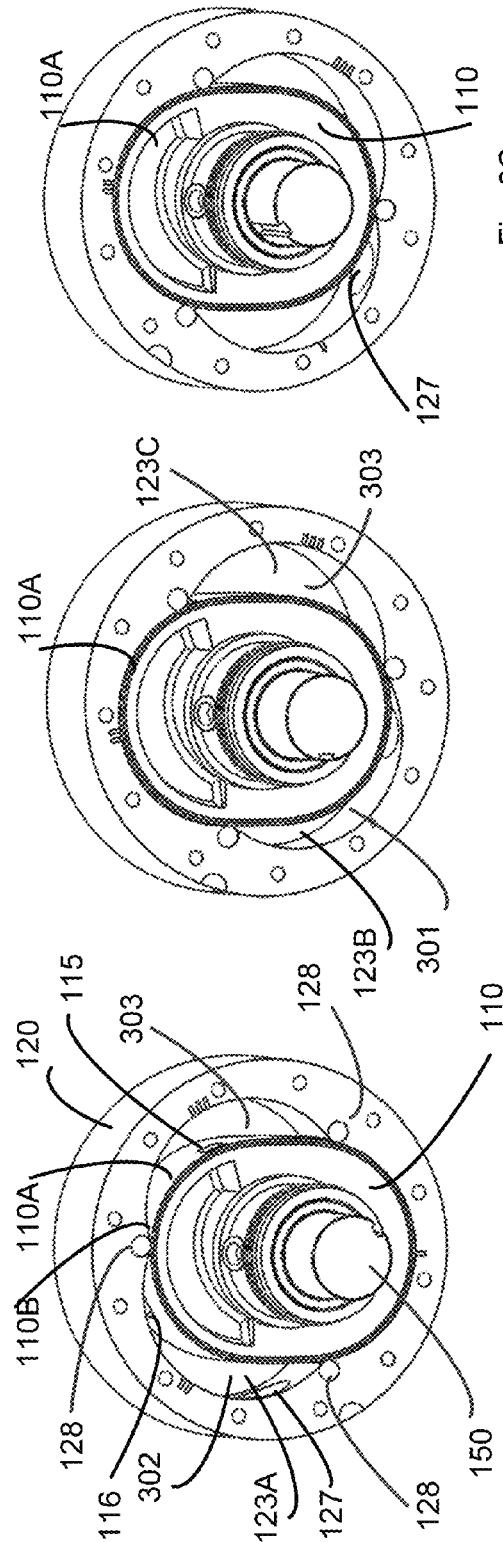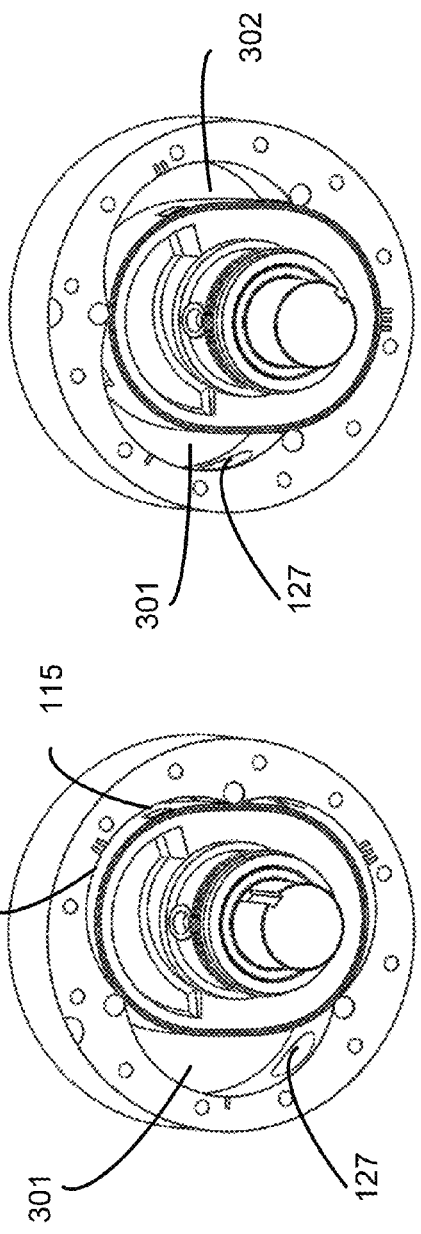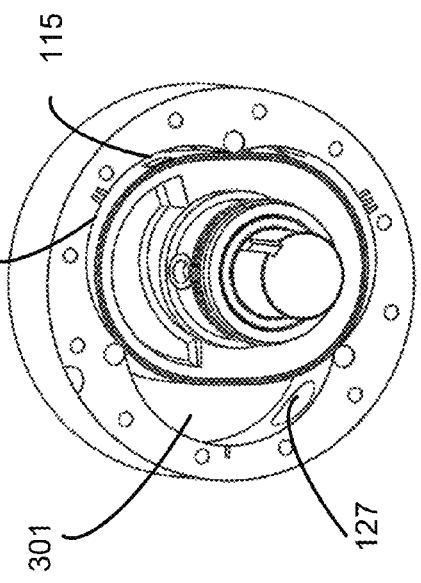

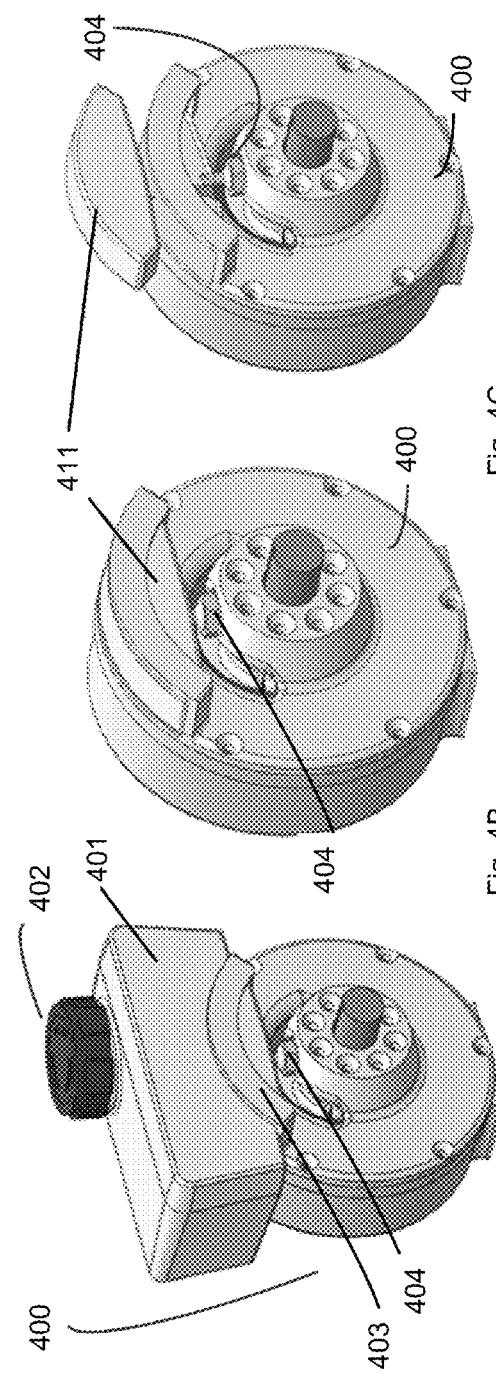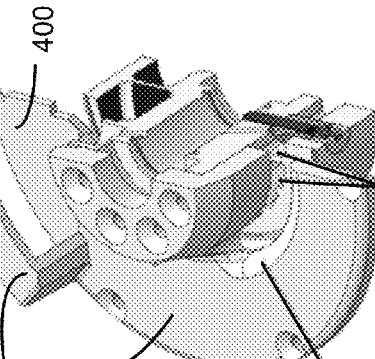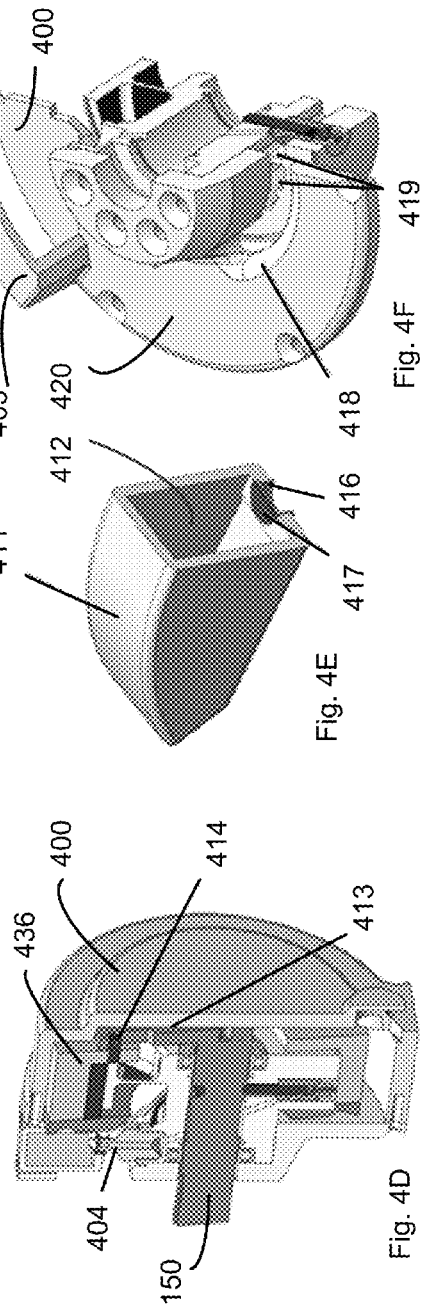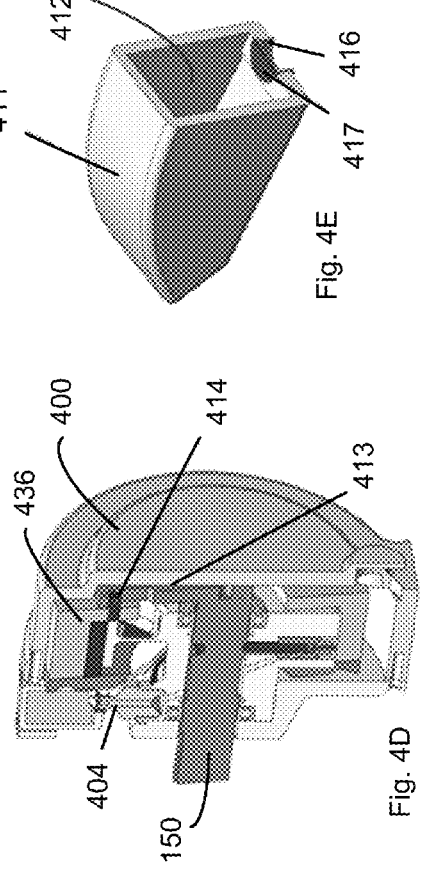

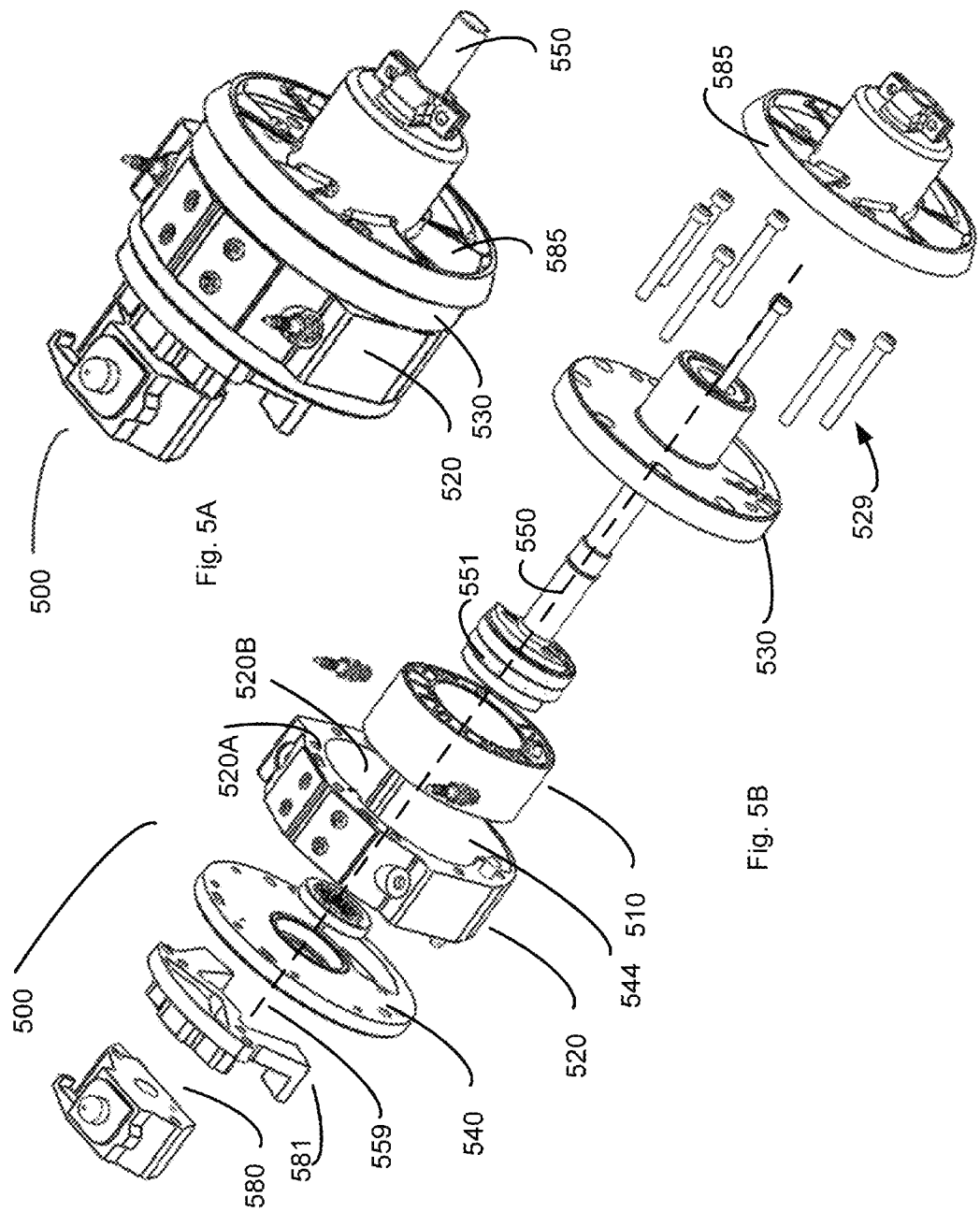

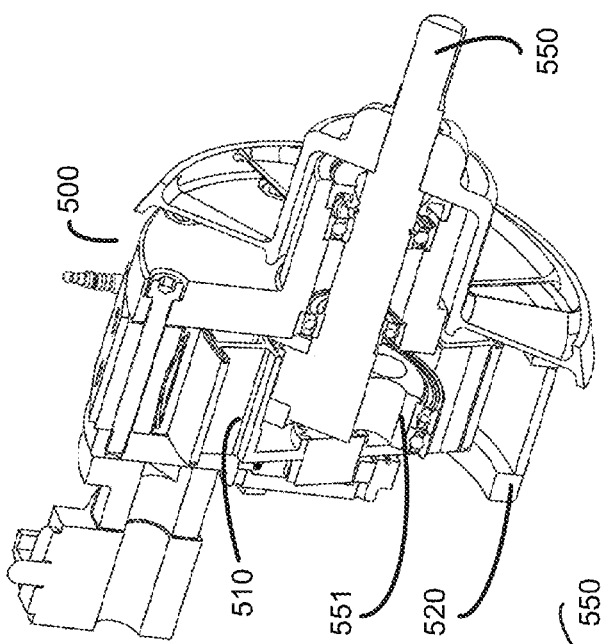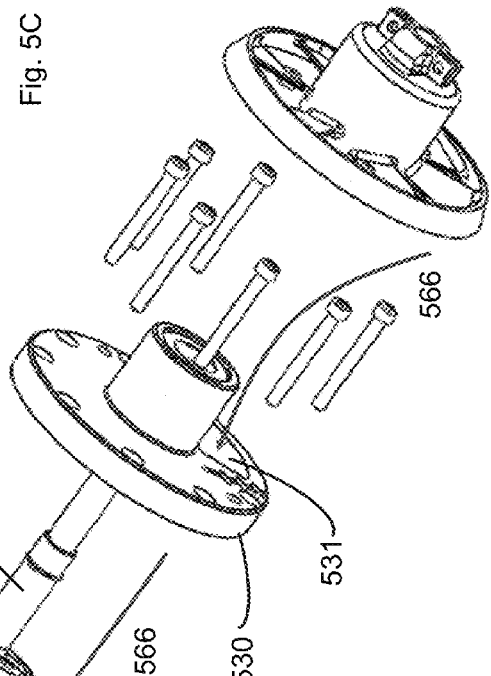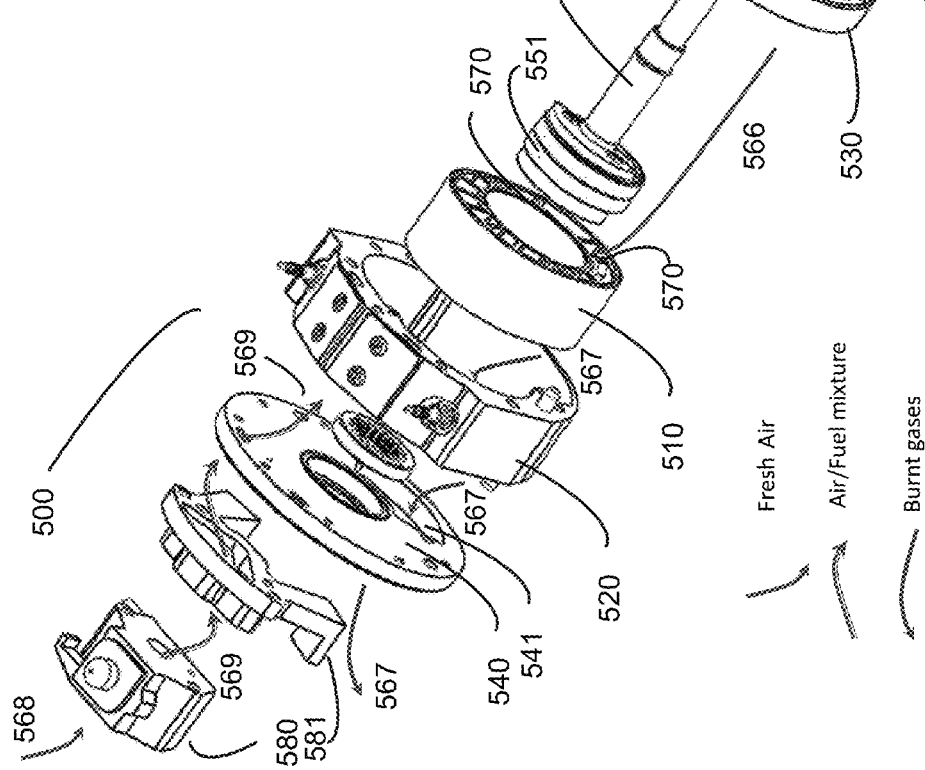
Fig. 5C
Fig. 5D

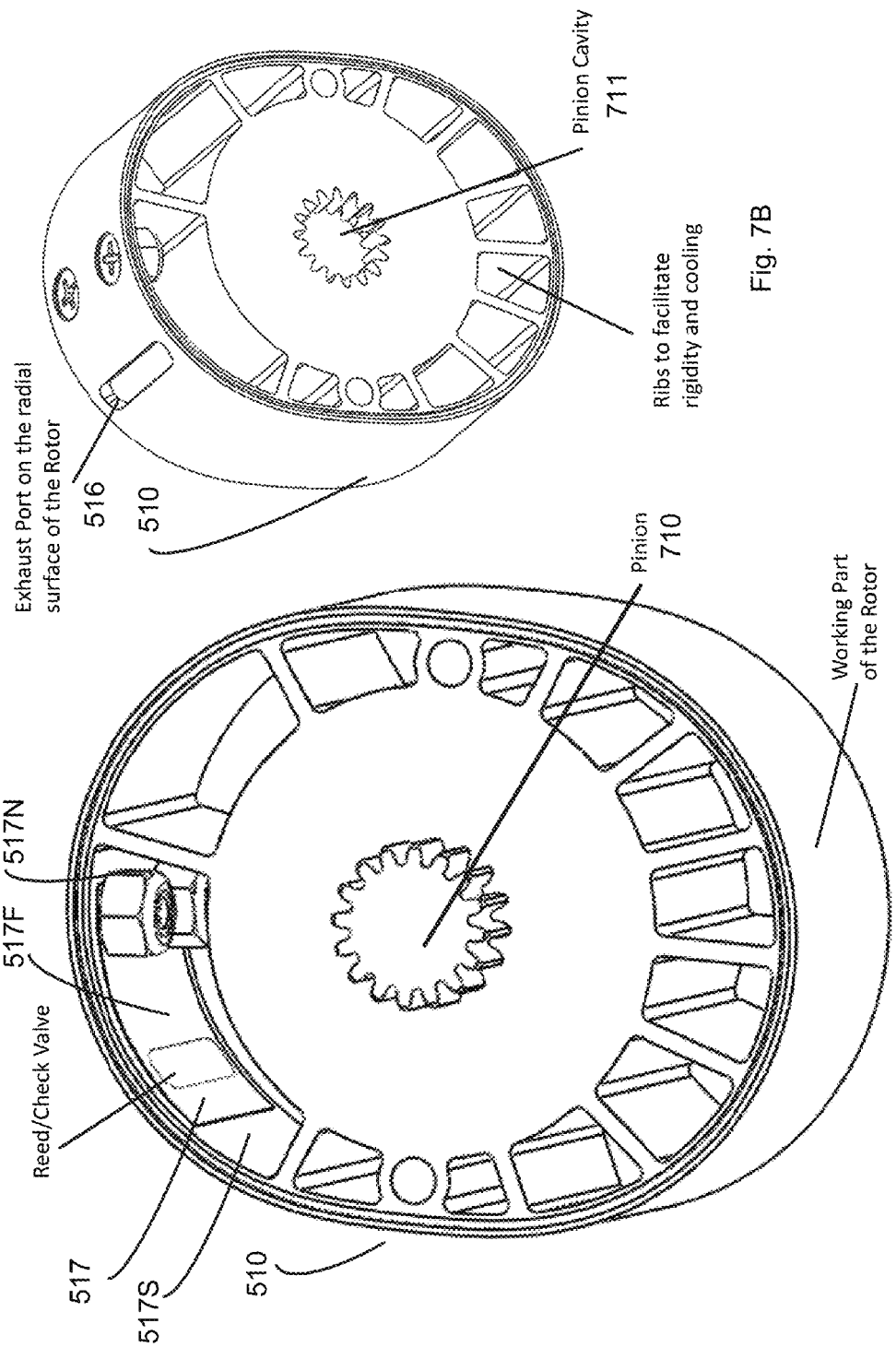

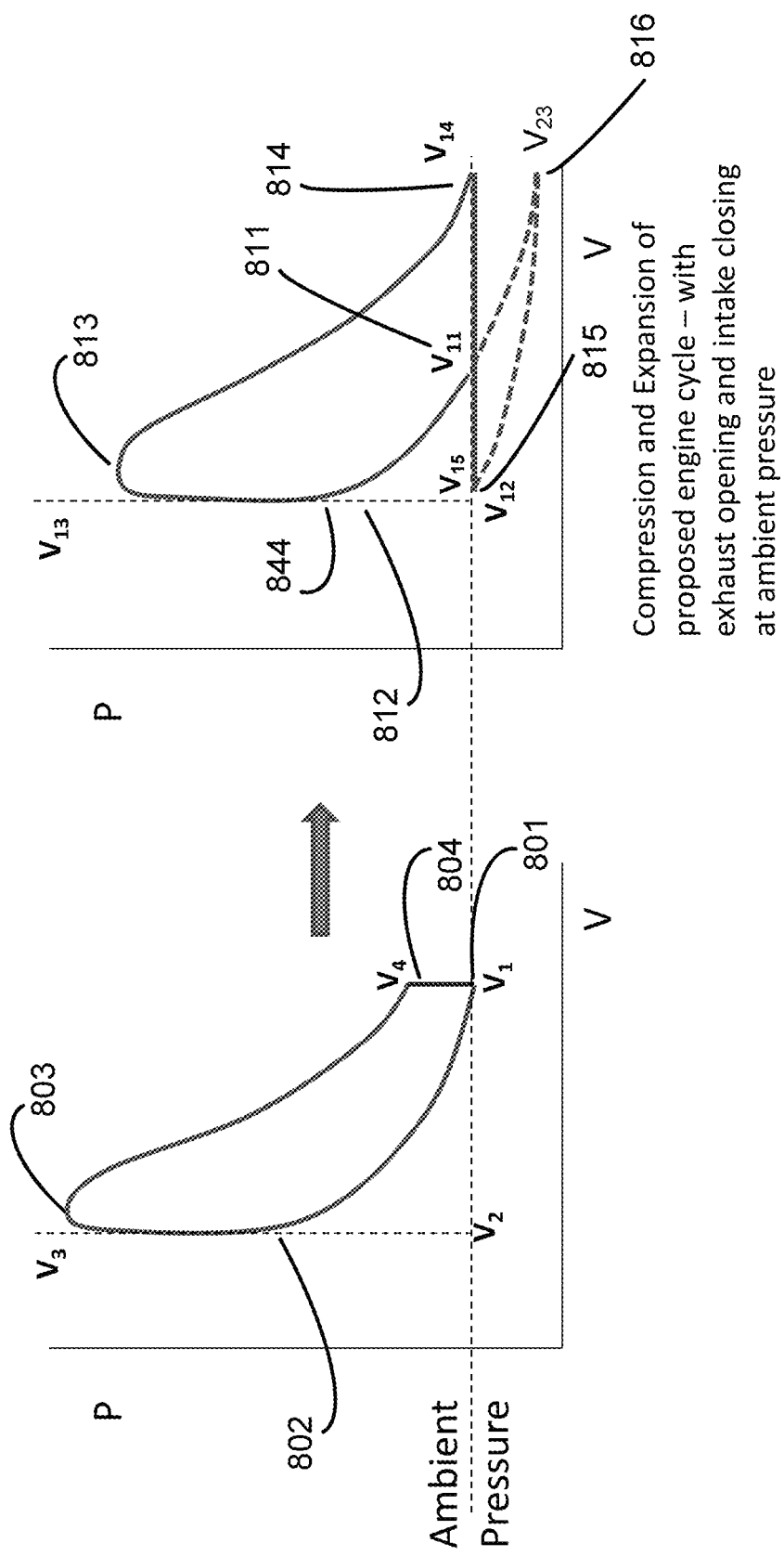

AIR-COOLED ROTARY ENGINE

CROSS-REFERENCE TO RELATED APPLICATIONS

The present application claims priority from U.S. provisional application Ser. No. 61/757,078, filed Jan. 25, 2013, and also claims priority from U.S. provisional application Ser. No. 61/765,339, filed Feb. 15, 2013, and also claims priority from U.S. provisional application Ser. No. 61/873,182, filed Sep. 3, 2013. All of the foregoing applications are hereby incorporated herein by reference in their entirety.

U.S. Pat. No. 8,523,546, titled "Cycloid Rotor Engine" and issued to Shkolnik et al. on Sep. 3, 2013, is incorporated herein by reference in its entirety.

TECHNICAL FIELD

The present invention relates to internal combustion engines, and more particularly to rotary engines.

BACKGROUND ART

It is known in the prior art to extract waste heat from an internal combustion engine by circulating a liquid through a closed-loop system having channels within the engine's block and radiators external to the engine's block. Such systems are effective, but such systems add weight and complexity to the engine, and also make the engine larger and more difficult to maintain.

It is also known in the art to cover external parts of an engine, such as an exposed surface of cylinder and cylinder head for example, with heat-radiating fins that provide a large surface area exposed to cooling air external to the engine. Such systems are effective in some applications, but require open space to allow for air flow around the engine, thereby requiring an engine compartment significantly larger than the engine, and/or ductwork direct air flow to and from the engine. In addition, dissipating heat via the external surface of an engine risks exposing the engine's user, such as a motorcycle rider for example, to the dangerously hot fins.

SUMMARY OF THE EMBODIMENTS

In a first embodiment, an improved rotary engine of the type having an N-lobed rotor, an intake port, an exhaust port, and a housing with respect to which the rotor is mounted for rotational motion relative to the housing, the housing having N+1 lobe-receiving regions configured to successively receive the lobes as the rotor rotates relative to the housing, the housing having (i) a pair of sides axially disposed on first and second sides of the rotor, and (ii) a peak disposed between each pair of adjacent lobe-receiving regions, and, wherein the housing is further configured in relation to the rotor so as to establish a chamber associated with each one the lobe-receiving regions, wherein at least one of the chambers is configured to handle, in succession, intake, compression, combustion, expansion, and exhaust phases, includes an improvement characterized in that the configuration of the housing in relation to the rotor is so as to establish at least one chamber dedicated solely to a function selected from the group consisting of cooling, compressing, pumping and any combination of any of the foregoing.

In some embodiments, the function is cooling and the dedicated chamber is a cooling chamber. Indeed, in some embodiments the cooling chamber is configured to receive flow of a cooling medium therethrough that also comes into contact with the rotor so as to cool the rotor. For example, in some embodiments the cooling chamber is configured to receive axial flow of the cooling medium therethrough. To that end, some embodiments of a rotor include at least one channel therethrough to receive flow of the cooling medium. That at least one channel may be disposed axially.

In some embodiments, the rotor has a plurality of axial channels separated from one another by ribs. The ribs may be angled so as to serve as fan blades to pump the cooling medium through the cooling chamber.

In some embodiments, the cooling medium is air. In some embodiments, the aggregate volume of all of the chambers configured to handle, in succession, intake, compression, combustion, expansion, and exhaust phases is less than 500 cc.

In some embodiments, the chambers are configured so that chamber volume at the end of the expansion phase is larger than the chamber volume at the start of the compression phase. In some embodiments, the chambers are configured so that the chamber pressure at the end of the expansion phase is approximately 1 atmosphere.

Some embodiments of the engine also include counterweights disposed within the rotor but coupled to a drive shaft so as to turn with the drive shaft and to counterbalance the rotor.

In another embodiment, an improved rotary engine of the type having an N-lobed rotor, an intake port, an exhaust port, a housing with respect to which the rotor is mounted for rotational motion relative to the housing, the housing having N+1 lobe-receiving regions configured to successively receive the lobes as the rotor rotates relative to the housing, the housing having (i) a pair of sides axially disposed on first and second sides of the rotor, and (ii) a peak disposed between each pair of adjacent lobe-receiving regions, wherein the housing is further configured in relation to the rotor so as to establish a chamber associated with each one of the lobe-receiving regions, wherein a plurality of the chambers are configured to handle, in succession, intake, compression, combustion, expansion, and exhaust phases, includes an improvement characterized in that a single fuel combustion source configured to supply fuel to at least two of the plurality of chambers.

Some embodiments include a single fuel source including a carburetor coupled to a conduit disposed in a peak through which is supplied an air-fuel mixture to two adjacent chambers. Indeed, some embodiments include a single fuel source including a conduit in the rotor. In some embodiments the single fuel source includes an injector disposed in the rotor and coupled to the conduit. For example, the conduit may be coupled to the intake port, and the single fuel source includes a carburetor, coupled to the conduit, supplying an air-fuel mixture to the conduit.

In some embodiments, the chambers are configured so that chamber volume at the end of the expansion phase is larger than the chamber volume at the start of the compression phase. In some embodiments, the chambers are configured so that the chamber pressure at the end of the expansion phase is approximately 1 atmosphere.

In some embodiments, the engine includes counterweights configured to balance the rotor.

An engine according to any of the foregoing embodiments may also include removably attachable cartridge, containing fuel, or a mixture of fuel and oil.

BRIEF DESCRIPTION OF THE DRAWINGS

The foregoing features of embodiments will be more readily understood by reference to the following detailed description, taken with reference to the accompanying drawings, in which:

FIGS. 1A-1G schematically illustrate features of a first embodiment of a rotary engine;

FIGS. 2A-2B schematically illustrate a fuel injector;

FIGS. 3A-3E schematically illustrate the engine of FIGS. 1A-1G at several stages of operation;

FIGS. 4A-4F schematically illustrate features of some embodiments of rotary engines;

FIGS. 5A-5H schematically illustrate features of an embodiment of an air-cooled rotary engine;

FIGS. 7A-7B schematically illustrate a rotor of a rotary engine;

FIG. 8A and FIG. 8B schematically illustrate pressure-volume diagrams of modes of engine operation;

DETAILED DESCRIPTION OF SPECIFIC EMBODIMENTS

Figure 1D:
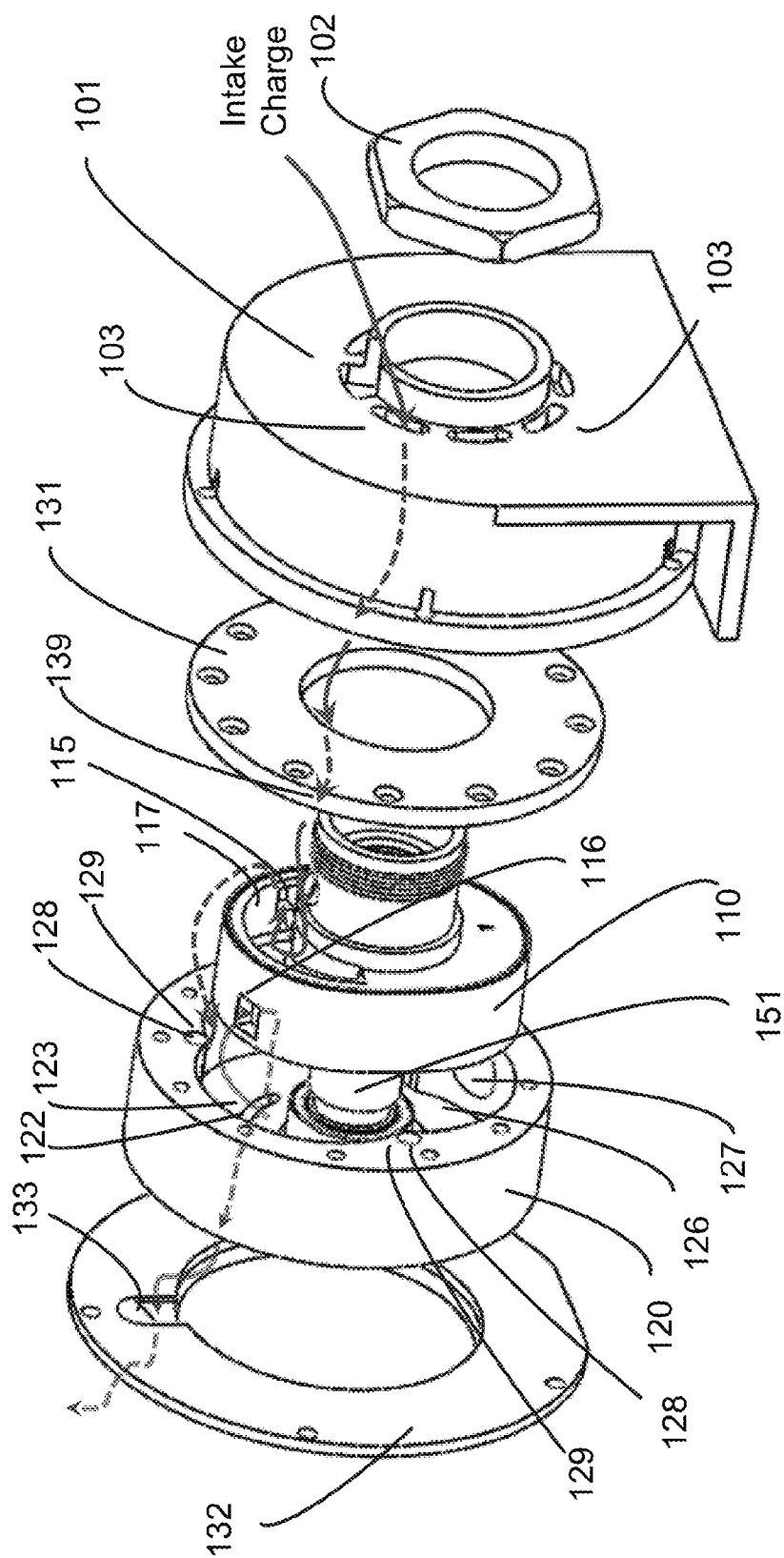

Embodiments of internal combustion engines, and features of such engines, as described below provide reduced cost of fueling the engine with multiple chambers by utilizing a single fuel carburetor or injector, reduced cost and complexity of igniting fuel in multiple chambers by having a single ignition source which serves multiple chambers, and in-expensive and non-complicated ways to cool the engine, for example by having dedicated air cooling chambers which are exposed to the rotor, or blowing fuel-air mixture through the inside of the rotor.

The result is an engine which is compact, lightweight, quiet, and fuel efficient, yet is simple and low-cost to manufacture.

Definitions. As used in this description and the accompanying claims, the following terms shall have the meanings indicated, unless the context otherwise requires:

A "rotor" is an N-lobed member that moves relative to a housing as part of an engine.

A "housing" is an (N+1)-lobed member that moves relative to a rotor as part of an engine. Either the housing or the rotor may be fixed, or the engine may be configured so that neither the housing nor the rotor is fixed.

A "working chamber" is a chamber formed between an (N)-lobed member and an (N+1) lobed member, and in which occurs at least one of intake of air or an air/fuel mixture, compression of air, combustion of fuel, and expansion of the products of fuel combustion.

"Carbureted air" is fresh air that has been carbureted by the addition of fuel or fuel and oil, for example by the action of a carburetor, or a fuel injector.

A "cooling chamber" is a chamber formed between an (N)-lobed member and an (N+1) lobed member, and which is not a working chamber.

The term "fluid isolation" or "fluidly isolated" when used to describe two volumes within an engine means that the two volumes are configured such that a fluid, such as uncombusted air or byproducts of combustion, will not flow between the two volumes when the engine is operating.

The "initial volume" or "maximum volume" of a compression chamber is the volume of the compression chamber at the point in an engine's cycle at which the chamber becomes fluidly isolated from the environment outside of the engine. In some embodiments, this is denoted as "V1."

The "final volume" or "maximum volume" of an expansion chamber is at the point in an engine's cycle immediately prior to the point at which the chamber is no longer fluidly isolated. In some embodiments, this is denoted as "V4."

A "fuel combustion source" may be any of a fuel injector in compression-ignition engines; a carburetor in conjunction with an ignition source (e.g., a spark plug or a glow plug), or a fuel injector in conjunction with an ignition source (e.g., a spark plug or a glow plug).

First Embodiment

A first embodiment of a rotary engine 100 is schematically illustrated in FIG. 1A-FIG. 1G, and includes an N-lobed member 110 (which may be referred to simply as "member 110" or "rotor 110") rigidly attached to an engine body 101 as well as an N+1 lobed member 120 (which may be referred to simply as "member 120" or "housing 120") that is rotatably disposed within the engine body 101. Note that in a first embodiment, the N-lobed member 110 is stationary with respect to the engine body 101, and the N+1 lobed 120 member is rotatably disposed within the engine body 101. In operation, the rotor 110 is disposed within a housing cavity 126 in the housing 120, and the housing 120 rotates around the rotor 110 to form working chambers of an internal combustion engine, as described in more detail below.

Note that in other embodiments, however, the housing 120 may be disposed in a fixed relationship to the engine body 101, and the rotor 110 is rotatably disposed within the housing 120. For example, the rotor 110 may be rotatably coupled to the drive shaft 150, and housing 120 may be fixedly coupled to the engine body 101 via cover 132, for example, so that motion of the rotor 110 turns an eccentric on the drive shaft 150. In this way, the rotor 110 would move relative to the housing 120 in the ways described below, such that the description of the execution of the engine's cycle as described below is applicable.

Generally, there are several possible configurations to implement an engine based on the geometry shown in FIG. 1A and FIG. 1F:

(I) Member 120, is stationary; while member 110, is executing a compound rotation: i.e. it rotates around the eccentric 152 with angular velocity $-\Omega$, while its center, coincident with the eccentric portion 152 of the shaft 150, rotates with the shaft's angular velocity $+2\Omega$;

(II) Member 110 is stationary; while member 120 is executing a compound rotation: i.e. it rotates around the eccentric shaft 152 with angular velocity $-\Omega$, while its center, coincident with the eccentric portion 152 of the shaft 150, rotates with the shaft's angular velocity $+2\Omega$; and (III) Both members 120 and 110 rotate around two different fixed axis. Member 110 is fixed on the shaft 150.

The rotary engine 100 is schematically illustrated in FIG. 1A, and is shown in cutaway view of FIG. 1B, and an exploded view of the engine 100 is schematically illustrated in FIG. 1C.

The engine 100 includes a drive shaft 150 that extend through the engine body 101, and defines an axis about which the housing 120 rotates. The axis about which the housing 120 rotates is schematically illustrated by line 159 in FIG. 1E, and that line 159 does not represent a physical component of the drive shaft 150. The drive shaft 150 is rotatably supported within the engine 100 by several bearings 155 along the length of the drive shaft 150, and passes through the engine body 101, the rotor cover 131, the rotor 110, the housing 120 and the engine cover 132. Seals 170 inhibit flow of working gases out of the engine 100 between the rotor 110 and the drive shaft 150. In some embodiments, the seals 170, the rotor 110 and the drive shaft 150 form part of a fuel conduit 106 as described further below.

The rotor 110 is rigidly attached to the engine body 101 by nut 102 secured to the threaded neck 113 where that neck 113 passes through the rotor cover 131 and a wall 104 of the engine body 101. In this embodiment, the rotor 110 is a cycloidal disk having two lobes (i.e., N=2), but other embodiment may have 1 lobe, 3 lobes, 4 lobes, or more. The rotor 110 includes an internal rotor chamber 117, and a rotor intake port 115 and a rotor exhaust port 116 between the internal rotor chamber 117 and the radial surface 111 of the rotor 110. The rotor intake port 115 and a rotor exhaust port 116 may include a check valve (e.g., a reed valve such as valve 117 schematically illustrated in FIG. 5H, for example) that allows gas to flow only in one direction (i.e., out of the rotor 110 through intake port 115 and into the rotor 110 through exhaust port 116).

The housing 120 is rotatably coupled to the drive shaft 150 by eccentric 152, which in this embodiment is disposed within one of the bearings 155 (designated 155A in FIG. 1E for ease of reference), so that the bearing 155A is between the eccentric 152 and the housing 120. In this embodiment, the housing 120 rotates at a fraction of the angular velocity of the drive shaft 150, and in the opposite direction, and causes the drive shaft 150 to rotate. For example, if the drive shaft rotates at an angular velocity of 3 W, then the housing 120 rotates with an angular velocity of –W.

The eccentric 152 drives the housing 120 during the compression part of the engine's cycle, and is driven by the housing 120 during the expansion part of the cycle as the eccentric 152 transmits force from expanding gases within the engine to the housing 120. In some embodiments, the housing 120 may be driven by having a slide pin lever attached to the drive shaft 150 with a pin in the housing 120, or alternately by a pin in the lever engaging a slot in the housing 120, as described further below.

The rotor 110 is disposed within housing cavity 126 of the housing 120, and rotor cover 131 is fixedly coupled to the housing 120, so as to enclose the rotor 110 within the housing cavity 126.

The housing 120 includes (N+1) rollers 128, one at each apex 129 between lobe-receiving regions 123. The lobe-receiving regions are a portion of housing cavity 126. In operation, the rollers 128, guided by the rotor 110, force the housing 120 to rotate and nutate around the rotor 110. Thus the housing 120 executes a rotary motion around the axis (159) of the drive shaft 150 at the rate of ⅓ of that of the drive shaft 150 and, simultaneously, around its own axis of symmetry. Rollers 128, also serve as apex seals.

Figure 5E:
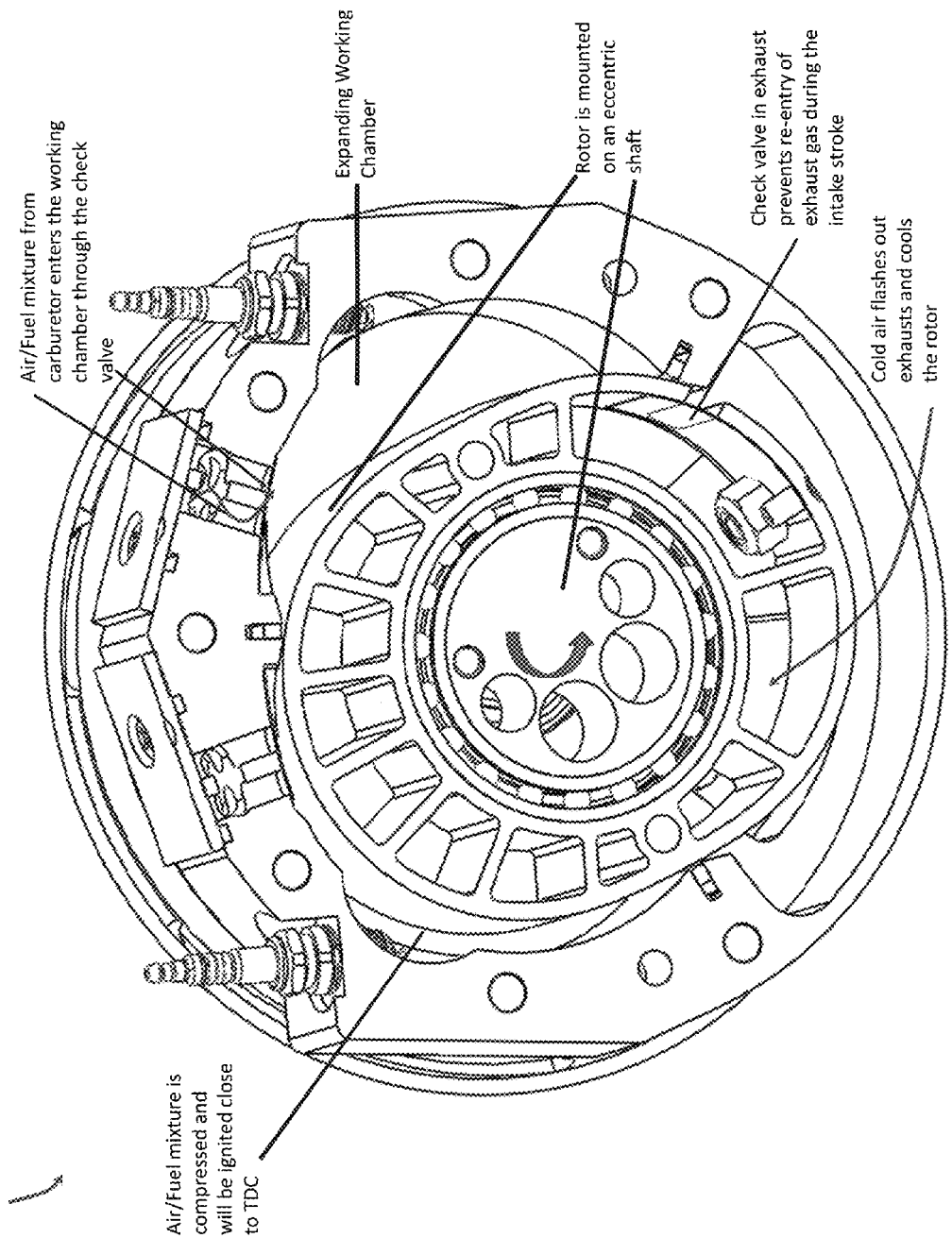

In alternate embodiments, the housing 120 may include conventional spring-loaded apex seals (e.g., 125 in FIG. 1E, or 551B as in FIG. 5E).

Generally, the engine 100 includes seals between the rotor 110 and the housing 120, and between the rotor 110 and the cover 131 to prevent or impede the escape of gas from within the housing cavity 126. To that end, the rotor 110 may contain spring-loaded side seals 160 which seal gas against flowing between the rotor 110 and the housing 120 or between the rotor 110 and the rotor cover 131. Alternately, the housing 120 and/or the rotor cover 131 may hold these side seals 160 to serve the same purpose, where each side seal 160 connects between apex seals (e.g., rollers 128 or seals 125) to form a "sealing grid."

In operation, the N+1 lobe receiving regions 123 and the lobes of the housing 120, along with the rotor cover 131, cyclically form chambers 301, 302 and 303 that undergo cyclic contraction and expansion, as described below.

FIGS. 3A-3E schematically illustrate the operational sequence of the engine 100 and its three working chambers 301, 302 and 303 as the engine 100 goes through the various phases of a 4-stroke cycle. The working chambers 301, 302 and 303 are formed between the lobe-receiving regions 123 and the lobes of the rotor 110, and the covers 131, 132. The engine 100 fires once per revolution of drive shaft 150. The housing 120 rotates at ⅓ the speed of the drive shaft 150, therefore executing 3 firing cycles per each turn of housing 120.

For the sake of clarity of further explanation, the Roman numerals (I, II, and III) are drawn at top of each chamber (301, 302 and 303, respectively) as shown in FIGS. 3A-3E. Table 1, below, describes the strokes occurring in each of the three chambers (301, 302, 303) in the course of a clock-wise rotation of housing 120 at five different positions, schematically illustrated in FIGS. 3A-3E.

TABLE 1

| Chamber | FIG. 3A | FIG. 3B | FIG. 3C | FIG. 3D | FIG. 3E |
|---|---|---|---|---|---|
| 301 | Combustion. The volume remains approximately constant during the combustion event over ~20 degrees of rotation due to geometry of housing and rotor, wherein the convex arc of the rotor 110 matches approximately the concave arc of lobe-receiving region 123B of the housing 120. | Expansion | Expansion | Expansion. Maximum volume is reached. Hot burnt (exhaust) gas will be expanded to the atmospheric pressure, i.e., V4 > V1, and P4 ≈ P1 | Exhaust |
| 302 | Exhaust. The exhaust gas is pushed by the housing 120 through the rotor exhaust aperture 116 into the housing cover 132 and through the window 133 in this cover 132 into the ambient atmosphere. Since P4 ≈ P1, this creates the "quiet" exhaust stroke. | Exhaust (almost at the end). | Exhaust ends | Intake | Intake |

TABLE 1-continued

| | | Time Instance | | | |
|---|---|---|---|---|---|
| Chamber | FIG. 3A | FIG. 3B | FIG. 3C | FIG. 3D | FIG. 3E |
| 303 | Intake | Intake. Part of the fresh charge is pushed back out of the chamber. This corresponds to the intake volume V1 and atmospheric pressure P1. | Intake ends - the roller or apex seal has crossed the intake port on the rotor. | Compression. The fuel will be injected by fuel injector 120 as the rotor lobe occupies a lobe-receiving region. | Combustion |

As schematically illustrated in FIG. 3A, chamber 301 is experiencing combustion of fuel with compressed air. The fuel is delivered to chamber 301 via fuel supply line 118, and is injected into the chamber 301 by fuel injector 200 as the chamber 301 passes the fuel injector 200 in the course of the rotation of the housing 120. In this embodiment, fuel enters the rotor 110 via fuel supply line 118, and is conducted through the rotor 110 by fuel conduit 106, to the fuel injector 200. As such, the single fuel injector 200 serves each chamber (301,302, 303) of the engine 100. Having a single fuel injector 200, and/or a single ignition source (e.g. spark plug) which can serve multiple working chambers (301, 302, 303) can significantly reduce the cost and complexity of the engine 100.

The fuel injector 200 includes an upper injector body 202 and a lower injector body 206. The lower injector body 206 may be electrically non-conductive. Fuel enters the fuel injector 200 via an intake port 210, which carries the fuel to an internal fuel chamber 207 within the fuel injector 200. When an external force, such as a force from cam 154, pushes plunger 201 into the lower injector body 206, the plunger 201 forces pin (or pintle) 205 to move out of orifice 208, thereby allowing the fuel to flow from the internal fuel chamber 207 into a chamber of the housing 120. Springs 203 and 204 return the plunger 201 and pin 205 to return to positions within the fuel injector 200 so that the orifice 208 is closed and fuel enters chamber 207 via port 210.

Air flow into the engine 100, and exhaust flow out of the engine, are schematically illustrated by arrowed solid and dashed lines in FIG. 1D. Fresh air (which may be known as an "intake charge") from outside of the engine 100 enters the engine body 101 through aperture or apertures 103 in the face 104 of the engine body 101. The intake charge passes between the engine body 101 and the radial surface 139 of the rotor cover 131 into rotor chamber 117. From there, the fresh charge passes through the rotor intake aperture 115 into the one of the chambers (301, 302, 303). For example, a fresh charge would be provided to chamber 303 via intake port 115 in FIG. 3D.

As the housing 120 rotates, a lobe-receiving region 123A engages lobe 110A of rotor 110 to form chamber 302, as schematically illustrated in FIG. 3B. As such, the fresh charge is compressed. Indeed, in some embodiments, the lobe receiving regions 123 of the housing 120 each include a combustion chamber 127, which forms part of the chambers (301, 302, 303) into which the fresh charge is compressed. The fuel injector 200, driven by 3-lobed cam 154, FIG. 1E, which is cut into the shaft 150, then injects fuel into the compressed air within the chamber 301, and specifically within combustion chamber 127 in embodiments that have a combustion chamber 127. In some embodiments, the fresh charge is compressed to, or beyond, a point at which the fuel will spontaneously combust (e.g., diesel ignition). In other embodiments, the engine 100 may also include an ignition device such as a spark plug or glow plug to initiate combustion. Such an ignition device may be part of the fuel injector 200. For example, high voltage could be supplied to the pintle 205 which would be closest to the grounded body of the rotor 110 exactly during the top dead center position, i.e. when spark is needed to initiate the combustion. Thus a single ignition device can serve multiple chambers, reducing the cost and complexity of the engine.

The volume of the chamber 302 remains constant during the combustion event over approximately 15, 20 or 25 degrees of rotation of the housing 120 (FIG. 3C), due to the geometry of the housing 120 and rotor 110, wherein the arc of the lobe receiving regions 123 matches approximately the arc of the lobe 110A.

After combustion, the byproducts of the combustion begin to expand, and push the housing 120 to continue the rotation of the housing 120 (FIG. 3D). The combustion byproducts pass through the rotor exhaust aperture 116 into the rotor chamber 117, as the housing 120 continues to rotate (FIG. 3E). From there, the combustion byproducts pass through one or more apertures 122 in the housing 120 and exit the engine 100 via cover aperture 133.

In some embodiments, the rotor intake port 115 and a rotor exhaust port 116 may be disposed in the rotor 110 to provide an initial volume of a chamber (e.g., 301, 302, 303) at the beginning of a compression stroke that is less than the final volume of that chamber at the end of an expansion stroke. For example, in FIG. 3A, the rotor exhaust port 116 is closer to the top 110B of the lobe 110A of rotor 110 than is the rotor intake port 115. Such asymmetric placement of the rotor intake port 115 and rotor exhaust port 116 provides an initial volume that is less than the final volume of each of the working chambers 301, 302, 303.

FIGS. 4A-4F

FIGS. 4A-4F schematically illustrate a variety of options and features that may be included in a variety of engines. These features, and their use, are applicable to but are not limited to embodiments of various engines described herein. For purposes of illustration, these features are described below in connection with a rotary engine 400.

In FIG. 4A, a fuel tank 401, having fuel cap 402, is mounted to engine 400 by bracket 403. The tank 401 is in fluid communication with fuel intake port 404, which delivers fuel from the tank 401 to one or more working chambers within the engine 400.

In some embodiments, however, fuel is provided to the engine 400 from a removably attachable replacement cartridge 411, as schematically illustrated in FIG. 4B and FIG. 4C. The cartridge 411 includes a leak-proof valve, or an interface including a rubber membrane 416 and foil 417, as schematically illustrated in FIG. 4E. The rubber membrane 416 seals fuel into the cartridge 411 and the foil 417 prevents rubber of membrane 416 from decomposing. In use, the fuel intake port 404 (FIG. 4C) easily penetrates the rubber membrane 416 and foil 417 as the cartridge 411 is lowered into position (FIG. 4B), thereby rendering the cartridge 411, and more particularly the interior volume 412 of the cartridge, in fluid communication with the fuel intake port 404. The cartridge 411 is removable by lifting it off of intake port 404. As such, the cartridge is attachable and removable, and is therefore attachably removable.

The cartridge 411 provides a number of potential benefits and options. For example, the cartridge 411 is designed to be inexpensive and disposable, e.g. "single-use" method for supplying fuel to the engine, and there will be a holding structure (e.g., bracket 403) for holding the cartridge 411 in place in the engine 400, for example as shown in the FIG. 4B. Fuel could be filtered during the cartridge filling process eliminating the need for fuel filter in the engine 400. Cartridges 404 could be brought back to distributor for recycling. Fuel in the cartridge can be premixed with oil or other additives to optimize engine operation and minimize user interface requirements for obtaining proper fuel, inserting liquid fuel in the engine 400, as well as supplying a proper amount of oil to the engine 400. Non-standard fuels (not available at gas stations) can be used. Low-ethanol fuels can also be used, reducing likelihood of engine damage due to ethanol which is becoming more readily available at gas stations and which is a major source of premature engine failure in small engines. The cartridge 411 may be used in any type of engine, and its use is not limited to small engines or to rotary engines.

A modified drive system is schematically illustrated in FIG. 4D, which displays the drive shaft 150 having a slotted extension 413, which is engaged with pin 414 rigidly or pivotally coupled with a rotor 436.

To facilitate the cooling of the internal components of an engine 400, it is possible to introduce a cutout 418 in the front cover 420 and cooling channels 419, as shown in FIG. 4F. Other methods (not shown) include: a) introduction of a heat pipe that will rapidly transfer heat from the injector and surround area of stationary parts and channel it to the intake side, b) charge cooling, e.g. routing the intake air charge so fresh cool air charge will first pass nearby the injector/spark plug on its route into the working chamber, c) oil or water cooling for example with the use of a water jacket for the stationary member, and allowing liquid to flow through channels in the rotating member, etc.

Fuel modulation—to control power level of the engine among many possible approaches may include a conventional helix placed on the plunger (piston) of the injector or variable and controllable number of lobes on the cam activating the plunger. It is also possible to choke the intake flow of fresh charge, thus controlling the amount of air or air/fuel mixture delivered to the working chamber. The choking could be accomplished via carburetor-style intake or by utilization of intake or intake/exhaust valves of poppet, rotary, Reed or any other suitable valve types (which may be referred to as "conventional-type valves").

Second Embodiment

An alternate embodiment of a rotary internal combustion engine 500 is schematically illustrated in FIG. 5A-5H, and the operation of the engine 500 is schematically illustrated in FIGS. 6A-6J.

The engine 500 includes a drive shaft 550 that extends through a rotor 510, a circumferential housing 520, an intake engine cover 530 and an exhaust engine cover 540. The drive shaft 550 includes cam 551 that is rotatably disposed within the rotor 510. The rotor 510, in turn, is rotatably disposed within the circumferential housing 520. The engine 500 may be configured to perform an engine cycle such as that schematically illustrated and described in connection with either FIG. 8A (symmetric location of ports) or FIG. 8B (throttled intake or over-expansion). Alternately, asymmetric ports (i.e., one port nearer the apex of a rotor lobe than the other) may be used within the rotor for a true over-expansion cycle (shown, for example, by the intake port 916 and exhaust port 917 in FIG. 9B, with said ports asymmetrically located so as to delay the closing of the intake port, making the expansion longer than the compression stroke).

FIG. 5A schematically illustrates the rotary engine 500, FIG. 5B schematically illustrates the cycloid rotary engine 500 in an exploded view and FIG. 5C schematically illustrates the cycloid rotary engine 500 in a cutaway view. The engine 500 includes a housing 520 having a body 520A (which may be known as a "circumferential body") having an aperture 520B, an intake cover 530 and an exhaust cover 540. In some embodiments, the intake cover 530 and/or the exhaust cover 540 are an integral part of the body 520A, and form a flat surface axially displaced from, and facing, the rotor 510. In other embodiments, the housing 520 and covers 530 and 540 are secured together by bolts 529. As such, the intake cover 530 and/or the exhaust cover 540 may be referred to simply as a flat part of the housing 520. The body 520A, the intake cover 530 and the exhaust cover 540 bear a fixed spatial relationship to one another, and together they define a cavity 544 for housing the rotor 510. The cavity 544 includes lobe-receiving regions 321 and 322, and cooling region 523.

In addition to the housing 520, FIGS. 5A and 5B include a number of other elements of the engine 500. An optional fan 585 provides air flow to the engine 500 for cooling purposes, as described further below. In this embodiment, the engine 500 also includes a carburetor 580 secured to the engine 500 by bracket 581. The carburetor 580 mixes fuel with fresh air to form a carbureted charge that is supplied into a working chamber in the engine 500 to be combusted and to act as a working medium. In other embodiments, however, fuel may be injected directly into a working chamber of compressed air, and combustion may be initiated by a compression-induced, glow plug-induced, or spark-induced ignition of the fuel. In FIGS. 5A-5H, structures 539A and 539B may, therefore, represent spark plugs, glow plugs, or fuel injectors.

Within the engine 500, the rotor 510 is rotatably coupled to a drive shaft 550. The drive shaft 550 is configured to rotate about the center point (or axis) 559 of the shaft 550, and includes an eccentric part 551, which is offset from the shaft by eccentricity "e". A force applied to the eccentric part 551 of the shaft 550 will act on the shaft 550, causing the shaft 550 to rotate. The engine 500 includes counterweights 582 sized, weighted and disposed so as to balance the rotor 510 and shaft assembly 550 as it rotates. The counterweights 582 may be disposed within the volume of the rotor 510, but they are rigidly coupled to the shaft 550, and rotate in the same direction and at the same rate as the shaft 550. The rotor 510 turns in the opposite direction as the shaft 550, and at a different speed.

In this embodiment, the rotor 510 has two lobes 510A, 510B, and the housing 520 has two lobe-receiving regions 521 and 522, as well as a cooling region 523, as schematically illustrated in FIGS. 5E-5H.

The lobes 510A, 510B are curved and have a curvature. The lobe-receiving regions 521 and 522 are defined by an equal number of intersecting curves, which form peaks 525, 526, 527, one peak at each intersection. The curves that define the lobe-receiving regions 521 and 522 have a curvature of a similar shape to the curvature of the lobes 510A, 510B, so that the inside curve of the lobe-receiving regions 521, 522 is the same as the outside curve of a lobe 510A, 510B—with the exception that a small gap should exist between the two curves to accommodate manufacturing tolerances and thermal expansion for components—so that any of the lobes 510A, 510B may completely occupy any of the lobe-receiving regions 521, 522.

Each peak 525, 526, 527, in turn, has a peak seal 551A, 551B, 551C, and each peak seal is radially biased so as to be in continuous sealing contact with the rotor 510, to form a number of working chambers, as described more fully below.

Additional detail of the rotor 510 is schematically illustrated in FIG. 7A and FIG. 7B. Pinion 710 is disposed in pinion cavity 711. The pinion 710 and the eccentric 551 phase and position the rotor 510 so that rotor 510 nutates inside of, but never contacts the lobe-receiving regions of the housing 520. In operation of the engine 500, the eccentric 551 transmits power from the rotating rotor 510 to transmission drive mechanisms (not shown). For example, transmission drive mechanisms may include a shaft of a lawn maintained tool such as the blade drive of a lawn mower, the drive wheels of a riding lawn mower, or a transmission axle coupled to a turning blade or string in a week cutting tool, to name but a few examples.

The cooling region 523 may have a shape that is distinct from the curvature of the lobe-receiving regions 521 and 522, as schematically illustrated in FIGS. 5E-5H, and the cooling region and lobes 510A and 510B may not form a working chamber when the lobes 510A, 510B enter the cooling region 523.

Each lobe 510A, 510B of the rotor 510 includes a one or more apertures 570. In FIG. 5E, apertures 570 are defined in part by radial ribs (or fins) 571. In some embodiments, the radial ribs 571 are shaped as fan blades to direct air flow into the engine 500, for example as schematically illustrated by fan-blade-shaped ribs 571F in FIG. 9C.

Figure 5G:
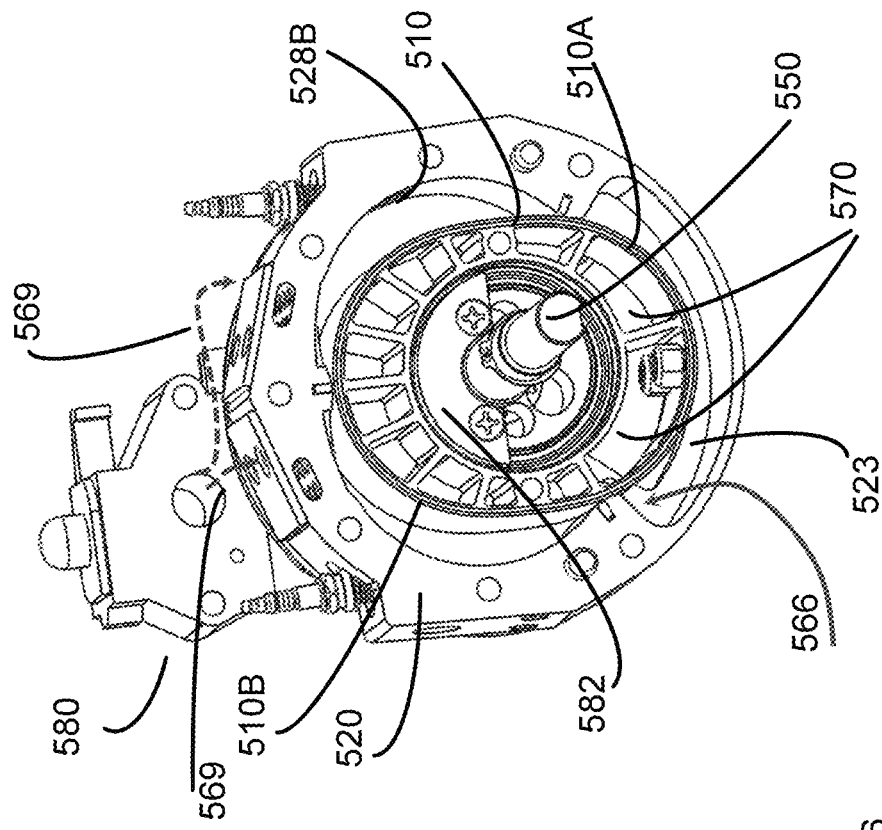
Figure 5F:
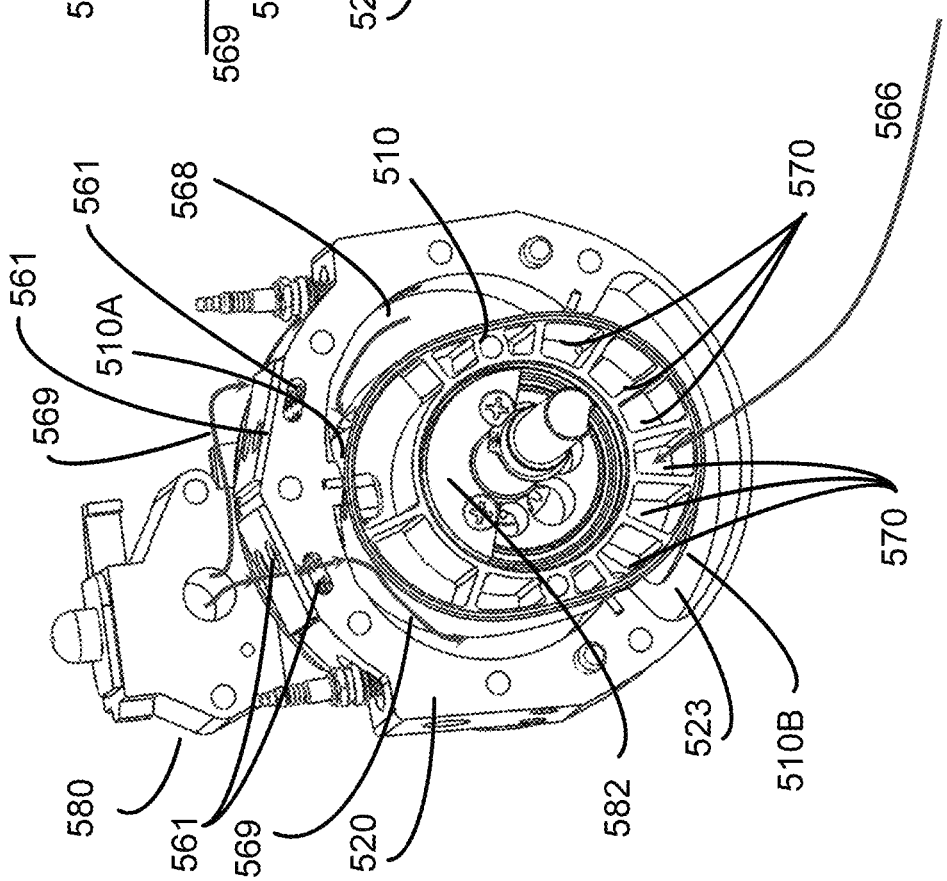
Figure 5H:
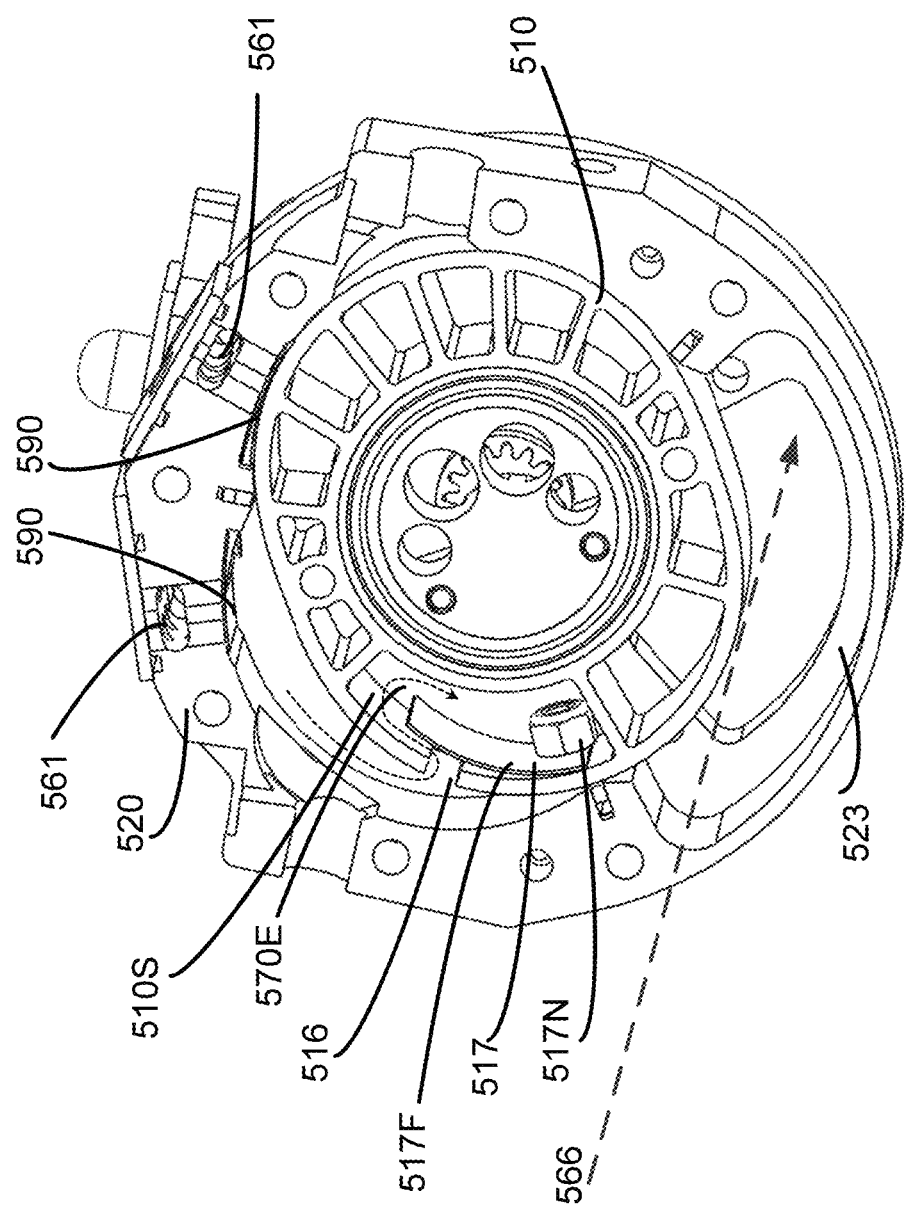

Cooling air flow through the engine 500 is schematically illustrated in FIG. 5D, as well as FIG. 5F, FIG. 5G and FIG. 5H. The cooling air flow begins with the draw of cool air 566 through cooling aperture 531 in cover 530. In embodiment with a fan 585, the air 566 may be inducted through cooling aperture 531 by the fan 585, but in embodiments with fan-blade radial ribs 571, the ribs 571 may induce air 566 through cooling aperture 531 in the course of the rotation of the rotor 510.

Next, the cooling air flows through the rotor 510. Specifically, the cooling air 566 flows through the apertures 570 as the lobes 510, 510B of the rotor 510 pass through the cooling region 523. As such, the apertures may be described as a channel through the rotor 510 to receive flow of the cooling air 566. The cooling air is heated by the rotor 510, and thereby cools the rotor 510, as it passes through the rotor 510. In addition, the cooling air 566 mixes with the products of combustion from the engine 500 to form exhaust 567, which then exits the rotor 510 through cooling exit aperture 541 in cover 540, taking some of the heat from the rotor 510 with it. The flow of the cooling air may be described as axial in that it proceeds through the engine 500 in direction roughly parallel to the axis 559, as schematically illustrated in FIG. 5D as well as FIG. 5H. FIG. 5H also schematically illustrates a reed valve 517 disposed to cooperate with aperture 516 to allow byproducts 567 of combustion to enter into rotor exhaust chamber 570E, but to impede or prohibit fluid flow through the aperture 516 in the opposite direction—i.e., from rotor exhaust chamber 570E. In this embodiment, the reed valve 517 includes a flap 517F secured to and interior surface 510S of the rotor 510 by a nut 517N such that the flap 517F covers the aperture 516.

As described above, the cooling air 566 flows through the engine 500 without passing through or being used in a working chamber, and without being gated (e.g., through a valve), compressed or expanded. The cooling air is distinct from a fresh charge used in combustion.

The engine 500 executes an engine cycle as the rotor 510 rotates with respect to the housing 520, and that operation is described below. FIGS. 8A and 8B schematically illustrate two engine cycles that engine 500 may execute.

Each point of the cycle is characterized by volume and pressure. The engine 100 may be configured to run either of the two cycles described below, as schematically illustrated in FIG. 8A and FIG. 8B.

In a first embodiment of an engine cycle, as schematically illustrated in FIG. 8A, in which V1, V2, V3 and V4 are the volume of a working chamber at points 1, 2, 3, and 4 respectively, and in which P1, P2, P3 and P4 are the pressure within the chamber at points 1, 2, 3, and 4 respectively:

Point 1 (801) represents the start of the cycle, characterized by—V1 and P1 (ambient pressure);

Point 2 (802) represents the end of compression—V2 and P2>P1;

Point 3 (803) represents the end of combustion—V3≈V2 (constant volume combustion) and P3>>P2;

Point 4 (804) represents the end of expansion—V4>V1 and P4>P1.

In a second embodiment of an engine cycle, as schematically illustrated in FIG. 8B in which V11, V12, V13, V14, V15 and V16 are the volume of a working chamber at points 11, 12, 13, 14, 15 and 16 respectively, and in which P11, P12, P13, P15 and P16 are the pressure within the chamber at points 11, 12, 13, 14, 15 and 16 respectively:

Point 11 (811) represents the start of the cycle, characterized by—V1 and P1 (ambient pressure). At this point, the working chamber is closed; the working chamber is not in fluid communication with the atmosphere.

Point 12 (812) represents the point the end of compression—V12 and P12>P1;

Point 13 (813) represents the end of combustion—V13≈V12 (constant volume combustion) and P13>>P12;

Point 14 (814) represents the end of expansion—V14>V11, and P14=P11=ambient pressure. At this point, the working chamber opens to the atmosphere and so the pressure within the chamber is ambient pressure.

After the working chamber reaches point 14 (814), the engine reduces the volume of the working chamber from V14 to V15 at point 15 (815). Between point 14 (814) and point 15 (815), the volume of the working chamber has been reduced, but the pressure within the working chamber remains at ambient atmospheric pressure (e.g., one atmosphere). As such V15<V14 but P2=P =ambient pressure. Point 15 (815) represents a minimum volume of the chamber, and exhaust has been expelled.

From point 15 (815), the volume of the chamber increases to a volume V23 at point 16 (816). During this period, the chamber has a partially-restricted communication with the atmosphere, so the flow of air into the engine is choked or throttled. The increase in volume, while choking the fresh charge flow through the carburetor 580, FIG. 5F, reduces the pressure within the working chamber, and the pressure within the working chamber drops below ambient pressure. From point 16 (816), the working chamber is no longer in fluid communication with the atmosphere. As the rotor continues to rotate, the volume of the working chamber begins to decrease. The air is compressed, and pressure within the working chamber begins to rise toward point 11 (811). The compression ends at volume V12, point 44 (844).

The pressure within the working chamber remains below ambient atmospheric pressure until the rotor reaches point 11 (811). By that time the chamber receives fresh charge of air/fuel mixture.

In some embodiments, through a single carburetor 580 allowing air to pass through two neighboring chambers via conduits 561 and reed/check valves 517 (e.g., FIG. 5F, FIG. 5G and FIG. 5H), air will open reed/check valve 590 in a chamber undergoing intake stroke. Fuel will enter into the intake chamber via carburetor as well. In other words, the air is carbureted.

It is desirable in many instances to make an engine quiet. In some embodiments, an engine (e.g., 500, 900) may be made quieter than it otherwise would have been by avoiding noisy features in other 4-stroke engines, such as poppet valves (metal-on-metal intermittent contacts), piston slap (e.g. piston-rattling and hitting the bore), and a rapid pressure drop when the exhaust gas is exposed to the environment. The pressure drop during exhaust can be reduced by throttling the air during the intake stroke. Throttling, in this case means that the engine is configured to start decreasing volume in the intake chamber while the air/fuel mixture is under some vacuum when the intake phase completes. During expansion time, however, gases will expand into the full volume of the expansion chamber until atmospheric pressure is attained, thereby decreasing exhaust noise. This is shown on the diagram in FIG. 8B, for example.

The cycle of FIG. 8B has several noteworthy characteristics. First, the cycle ends at atmospheric pressure (e.g., one atmosphere). This tends to make the operation of the engine quieter, at least because there is no audible "pop" from escaping pressurized gas when the working chamber opens at point 14 (814). Second, the initial volume of the compression chamber [i.e., at point 11 (811)] is less than the final volume of the expansion chamber [i.e., at point 14 (814)]. This overexpansion of the combustion byproducts (i.e., the combustion byproducts expand within the expansion chamber to a volume greater than the initial volume of the compression chamber) make the engine more efficient than it would be if the engine did not perform overexpansion.

FIGS. 5F and 5G, and FIGS. 6A-6J schematically illustrate the operational sequence of the engine 500 and its two working chambers 610 and 620 as the engine 500 goes through the various phases of a 4-stroke cycle, as described below and in Table 2.

In FIGS. 5F and 5G, and FIGS. 6A-6J, the rotor 510 rotates clockwise, while the drive shaft 550 rotates counterclockwise. As the rotor 510 rotates within the housing 520, the lobes 510A, 510B alternately enter and recede from lobe-receiving regions 521 and 522 and the cooling region 523. When the lobe 510A engages a lobe-receiving region 521, the lobe 510A, the housing 520, and the sides 530 and 540 form a working chamber 610 that is fluidly isolated from other areas of the engine. Similarly, the rotor 510 and the lobe-receiving region 522 form a second working chamber 620. However, the rotor 510 and the cooling region 523 do not form a working chamber, as described further below.

Figures 6A, 6B, 6C, 6D, 6E, 6F, 6G, 6H, 6I, 6J:
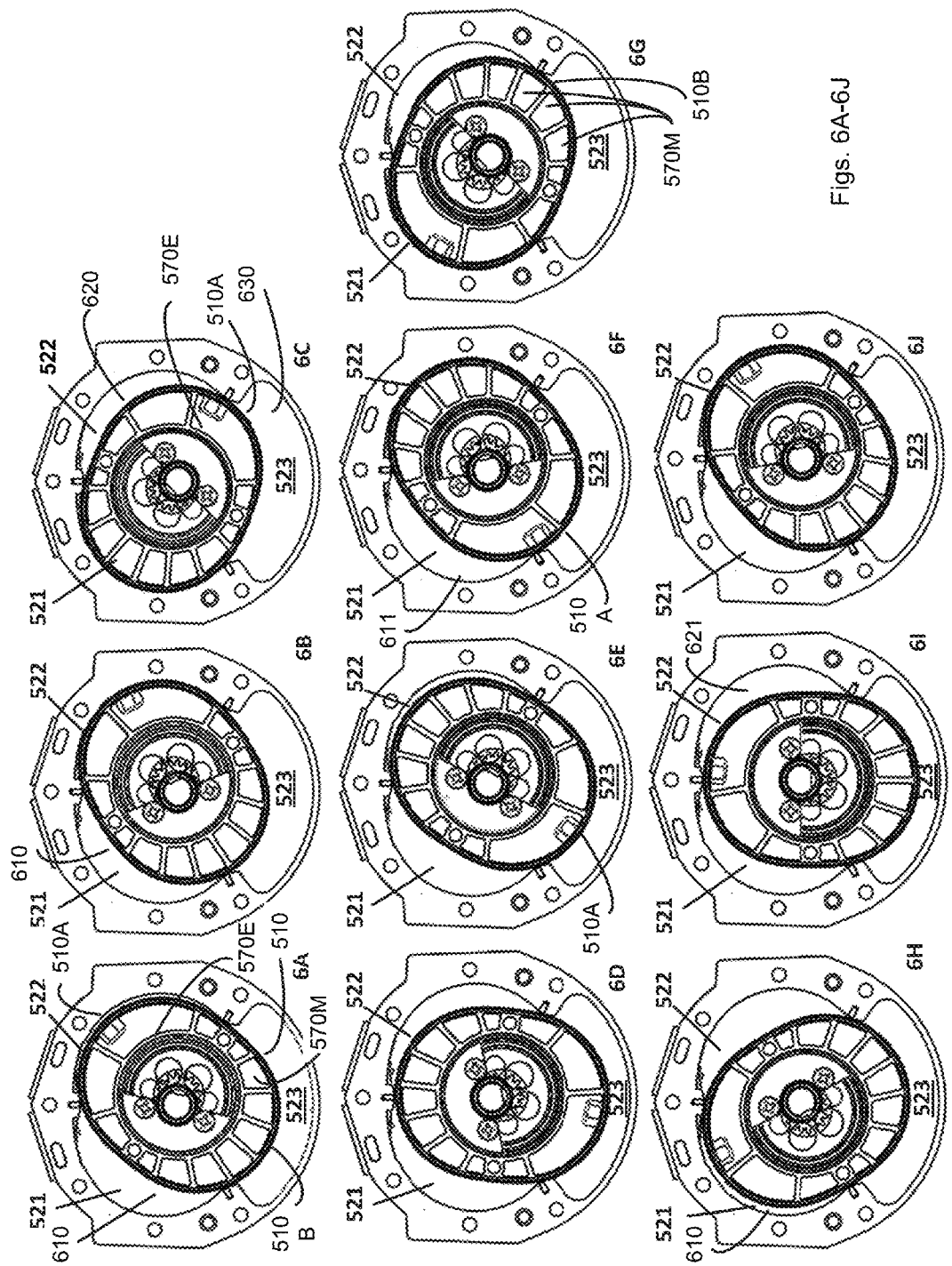
FIGS. 6A-6J schematically illustrate the engine of FIGS. 5A-5G at several stages of operation.

In FIG. 6A, lobe 510B is beginning to enter lobe-receiving region 521 and chamber 610 is formed and is fluidly isolated from the atmosphere. At this stage in the cycle, the pressure within chamber 610 is below ambient pressure of the atmosphere surrounding the engine 500. Also in FIG. 6A, lobe 510A occupies lobe-receiving region 522 and is at or near the end of its exhaust stroke. As such, byproducts 568 from combustion flow through aperture 516 and past reed valve 517 and into the exhaust cavity 570E within rotor 510 (see FIG. 5E). Also in FIG. 6A, a portion of lobe 510B is within cooling region 523, and cooling air 566 passes through the cooling region 523 and through the rotor 510 to cool the rotor 510. Note that, at this point, lobe 510B is effectively exposed to the atmosphere.

In FIG. 6B, the rotor 510 has rotated clockwise, and begun to compress the fresh charge of air in working chamber 610. At the same time, working chamber 620 begins to intake a fresh charge of air and fuel (which forms the "working medium") from the carburetor 580. In some embodiments, the fresh charge of air and fuel passes through a check valve (583A, 583B in FIG. 5E, or 590 in FIG. 5H, to illustrate two embodiments of check valves) that allows the fresh charge of air and fuel to flow only in a single direction—i.e., into a working chamber of the engine 500. A portion of lobe 510B is still within cooling region 523 and is cooled by air 566.

In FIG. 6C, the rotor 510 has rotated further clockwise. The compression of the fresh charge in working chamber 610 is complete, or nearly complete, and the working medium is compressed into the ignition chamber 528A, which is part of the working chamber 610. The spark plug 539A ignites the working medium within working chamber 610.

Note that in alternate embodiments, the working medium is only a fresh charge of air drawn into the working chamber 610, without fuel. In such embodiments, fuel may be injected directly into the working chamber 610, for example into the ignition chamber 528A, and the fuel will spontaneously combust due to compression-ignition, or could be spark-ignited or glow plug-ignited. For ease of illustration, however, spark ignition in a cycle according to FIG. 8B is described herein.

Also in FIG. 6C, chamber 620 continues the intake of a fresh charge of carbureted air, and a portion of lobe 510A is in chamber 523, where lobe 510A and any byproducts of combustion within the rotor exhaust chamber 570E are exposed to the flow of cooling air 566, e.g., through aperture 570E. Note that, at this point, at least a portion of lobe 510A is effectively exposed to the atmosphere.

In FIG. 6D, the rotor 510 has rotated further clockwise. Byproducts of combustion in chamber 610 begin to expand, urging the rotor 510 to continue its clockwise rotation. Chamber 620 continues the intake of a fresh charge of carbureted air, and lobe 510A is now further into chamber 523, where lobe 510A and any byproducts of combustion within the exhaust chamber 57E are exposed to the flow of cooling air 566.

In FIG. 6E, the rotor 510 has turned further clockwise. Chamber 610 has reached its maximum expansion volume and the combustion byproducts within chamber 610 have reached ambient atmospheric pressure. Chamber 620 is compressing its working medium, and lobe 510A remains exposed in chamber 630 as described above.

In FIG. 6F, lobe 510A is entering lobe-receiving region 521 to form an exhaust chamber 611. As the rotor 510 continues to rotate, the volume of exhaust chamber 611 will be reduced and byproducts of combustion will be forced into rotor exhaust chamber 571 and eventually expelled from the engine 500. In chamber 620, compression has ended and the fuel and air are ignited in combustion chamber 528B. Lobe 510A remains exposed in chamber 630 as described above.

In FIG. 6G, lobe 510A has fully occupied lobe-receiving region 521 and the exhaust stroke has ended. The volume of chamber 620 is increasing as the rotor 510 rotates clockwise in response to the expansion of the byproducts of combustion with chamber 620. Lobe 510B has partially entered region 523 and is exposed to cooling air 566. However, lobe 510B does not carry with it, or within it, byproducts of combustion, so the cooling air 566 does not mix with or carry away such byproducts of combustion in FIG. 6G. Note that, at this point, lobe 510B is effectively exposed to the atmosphere.

region 523. This is unlike prior art rotary engines with which the rotor is always sealed within the engine and never exposed to the atmosphere. Also, only the byproducts 567 of combustion pass through the rotor (i.e., rotor exhaust chamber 570E); the fresh charge of air, or carbureted air 569, does not pass through the rotor 510.

TABLE 2

Explanation to phase diagram shown in FIG. 6A-6J

| Position FIG. 6 | Chambers | | |
|---|---|---|---|
| | 610 | 620 | 630 |
| A | Is at the end of Intake Stroke. The volume of intake chamber −V1 is lower than that at the end of expansion (V4) stroke. The pressure is below ambient | Is at the end of Exhaust Stroke | Air blows through chamber 570M, cooling working part of the rotor |
| B | Compression starts. The pressure is at about ambient | Intake starts | Same as above |
| C | Compression is close to an end. Spark plug is ignited or fuel is injected. Combustion starts. | Intake | Air blows through chamber 570E, Removing exhausts from the Rotor and cooling the Exhaust side of the rotor |
| D | Expansion | Intake | Same as above |
| E | Expansion ends | Compression | Same as above |
| F | Exhaust | Compression Ends. Combustion | Same as above |
| G | Exhaust Stroke ends | Expansion | Air blows through chamber 570M, cooling working part of the rotor |
| H | Intake starts | Expansion ends | Same as above |
| I | Intake | Exhaust | Same as above |
| J | 360° of rotor rotation is completed. This is approximately the same rotor position as in 6A. | | |

Fuel is injected through a carburetor or fuel injector (port injection or direct injection)

In FIG. 6H, lobe 510A has begun to withdraw from lobe-receiving region 521 to form working chamber 610 again and carbureted air 569 is drawn into working chamber 610. Note that carburetor 580 provides carbureted air 569 to both working chamber 610 and 620. As such, carburetor 580 may be described as a single fuel source configured to supply fuel to at least two of several working chambers within the engine 500. At this point, working chamber 610 may be referred to as an "intake chamber." Chamber 620 has reached its maximum expansion volume and the combustion byproducts within chamber 620 have reached ambient atmospheric pressure. More of lobe 510B has entered region 523 and is exposed to cooling air 566.

In FIG. 6I, chamber 610 continues to intake carbureted air 569. Lobe 510A has begun to enter lobe-receiving region 522 to form exhaust chamber 621. As the rotor 510 continues its clockwise rotation, chamber 621 decreases in volume, forcing byproducts 568 of combustion into rotor exhaust chamber 570E. A portion of lobe 510B is still within region 523 and is exposed to cooling air 566.

In FIG. 6J, the rotor 510 has rotated further clockwise, and indeed at this point the rotor has made slightly more than a 360 degree rotation relative to its location in FIG. 6A. From this point, the cycle repeats as described beginning from FIG. 6A, above. A portion of lobe 510B is still within region 523 and is exposed to cooling air 566.

Figure 9A:
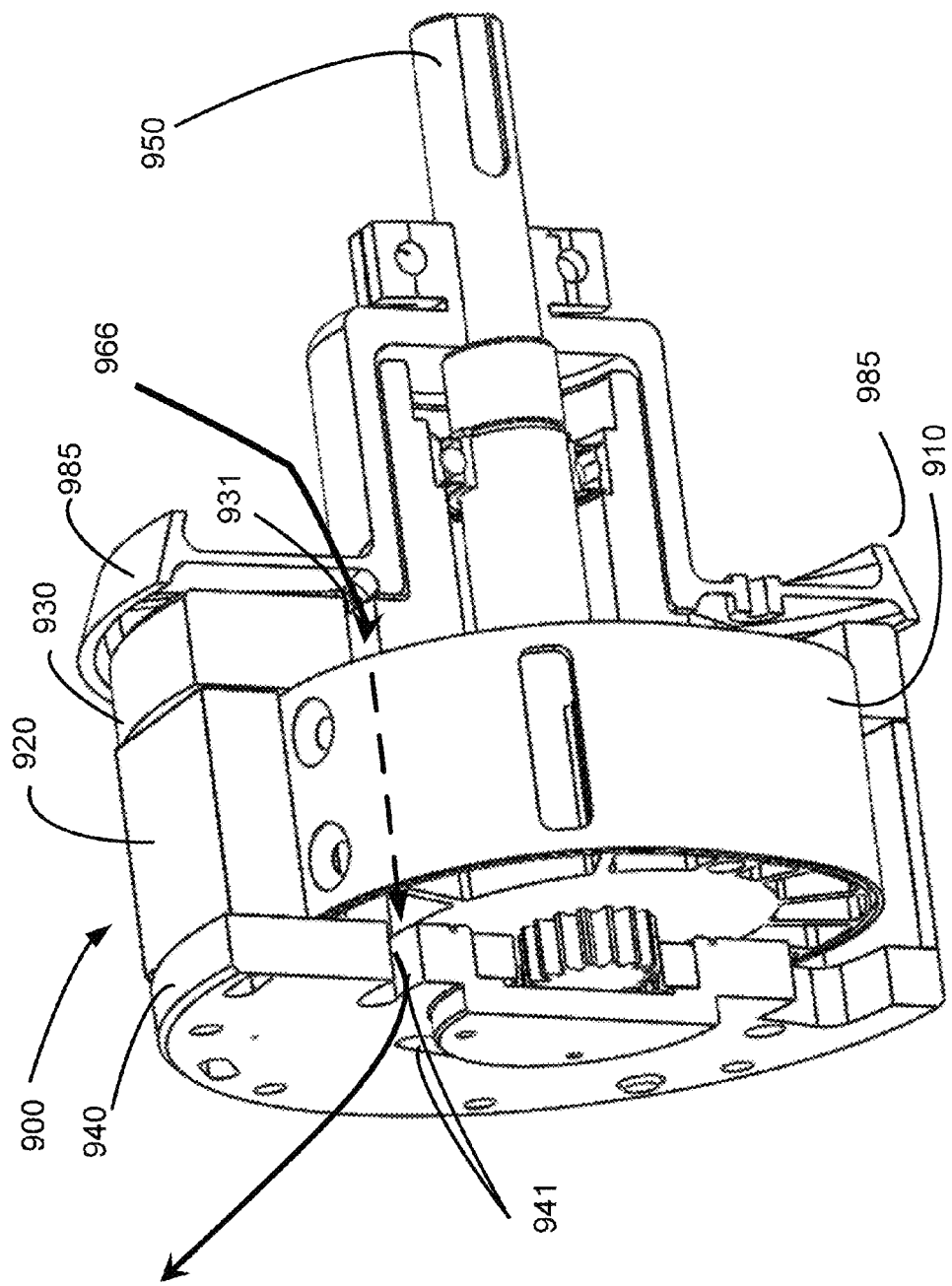
FIGS. 9A-9D schematically illustrate features of another embodiment of a rotary engine.
Figure 9C:
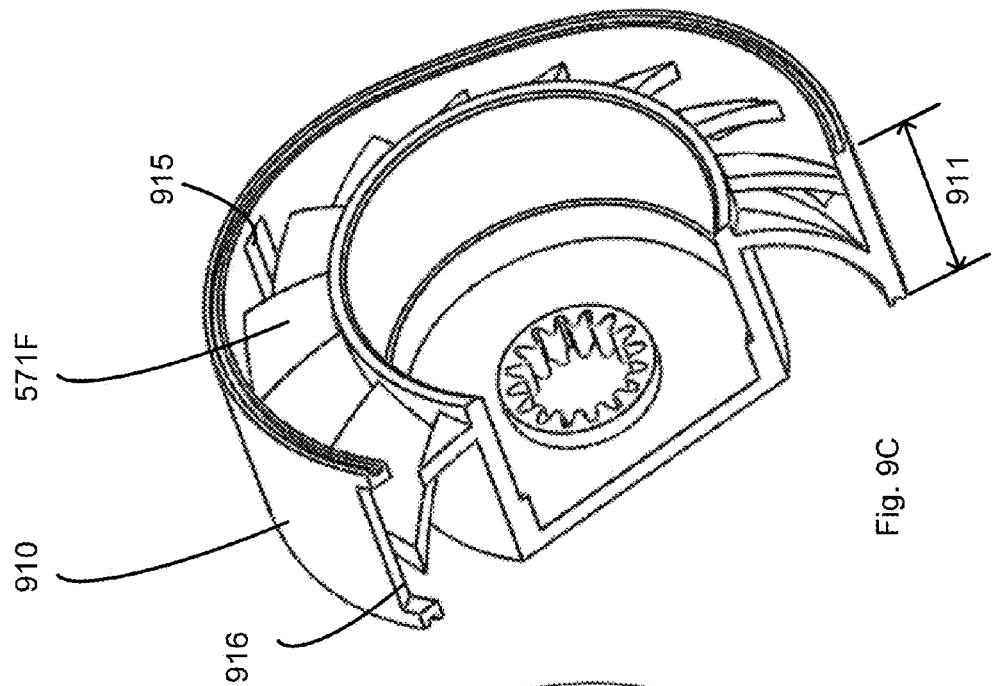
Figure 9B:
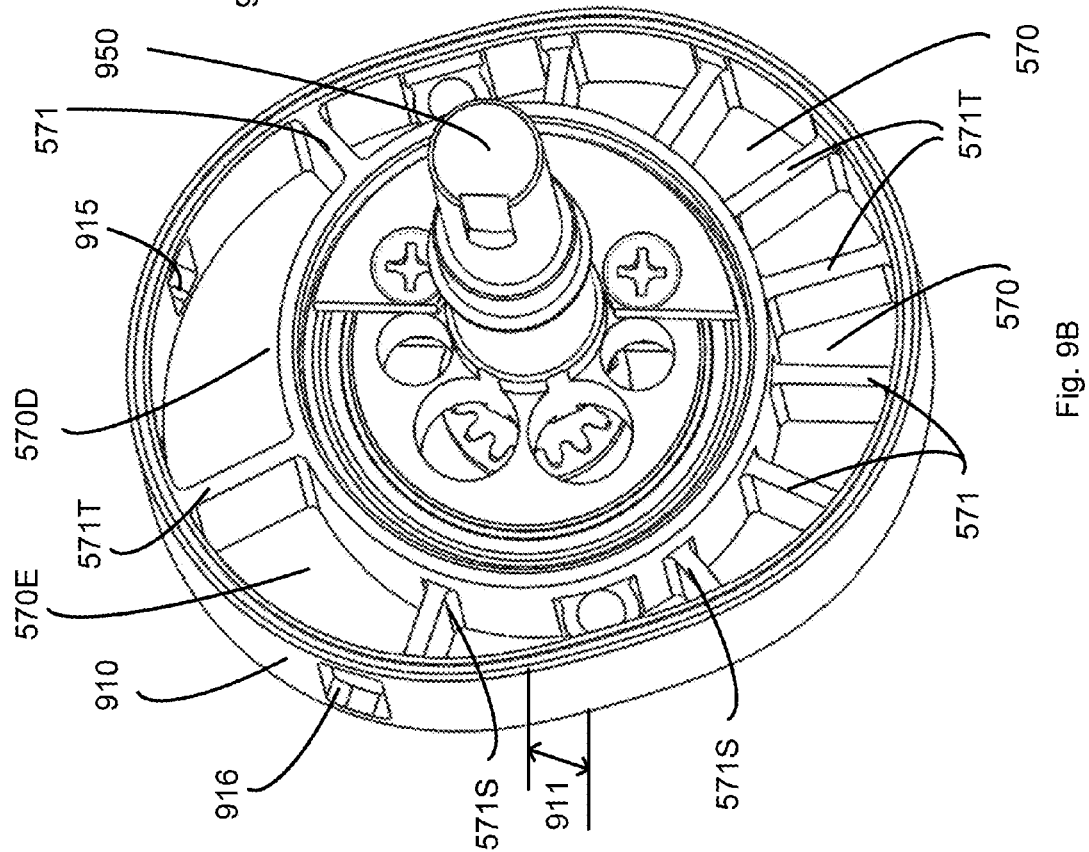

Note that in the engine 500 and its operation as described above, the lobes 510A and 510B of the rotor 510 are cyclically exposed to the atmosphere. For example, in the embodiments described above, the lobes 510A and 510B would be visible to an observer as they pass through cooling Third Embodiment Another embodiment of a rotary engine 900 is schematically illustrated in FIG. 9A, and is similar in many respects to the engine 500 of FIG. 5A. The engine 900 includes a drive shaft 950, a rotor 910, embodiment of which are further schematically illustrated in FIG. 9B and FIG. 9C, and a housing 920, as well as covers 930 and 940.

Cover 930 and 940 are similar to covers 530 and 540 described above, respectively, except that covers 930 and 940 include several small apertures 931, 941, respectively, to allow air 966 to flow through the engine 900 along the path illustrated by solid and dashed arrows. The air 966 may act to cool the rotor 910, similar to the cooling air 566 described above. Alternately, or in addition, the engine 900 may use some or all of the air 966 in the combustion process.

Rotor 910 includes a rotor intake aperture 915, and a rotor exhaust aperture 915, which serve the same purposes as apertures 116 and 117 in engine 100 described above in that each allows only uni-directional flow out of or into the rotor 910. The rotor 910 also includes widows or apertures through the side covers 930, 940, as schematically illustrated in FIG. 9A. A fuel injector 930 injects the fuel after intake port closing (i.e. at or above atmospheric pressure in the intake chamber). The air or air/fuel mixture enters one or more inlet apertures 931 the windows in the front cover 930 (next to the fan 985), goes through the rotor 920, partially filling the "inter-rotor space" 570E (i.e. space between the ribs 571). A part of this mixture will be delivered through the intake port 916 located in the rotor 910, while second and, probably larger part of the mixture will go through the ribbed structure (e.g., through apertures 570) of the rotor 910 and out through the window or windows 941 in the back cover 940 (furthest from the fan 985). Because the mixture contains fuel in a liquid form—it will serve as an excellent cooling media, but to prevent the emission of the fuel into the environment, the fuel will need to be recaptured (for example with cyclone separator, not shown) and returned into the fuel tank. Alternately, the fuel air mixture, if any is expelled from 941, can be piped back to the input 931 in a circuit (not shown).

If the rotor 910 includes additional apertures 931, 941 on the covers 930, 940, only relatively small part of an air stream 966 will be used to form the fuel/air mixture, which would simplify the fuel recovery mechanism.

The ribs 571 may contribute structurally to the stiffness of the rotor 910 and may also increase the surface area for heat exchange with the cooling air 966. Notice that ribs 571 may have a different height (in the axial direction). For example, two ribs (e.g., the rib designated 570T in FIG. 9B) that run across the whole width 911 of the rotor 910 define exhaust pocket, or conduit, 570E while all other shorter ribs (e.g., the rib designated 570S in FIG. 9B) allow for a large intake pocket (e.g., 570D in FIG. 9B) or a conduit 570 for cooling air (566; 966), because gas can pass around such ribs 571 S while remaining between the covers 930 and 940.

Figure 9D:
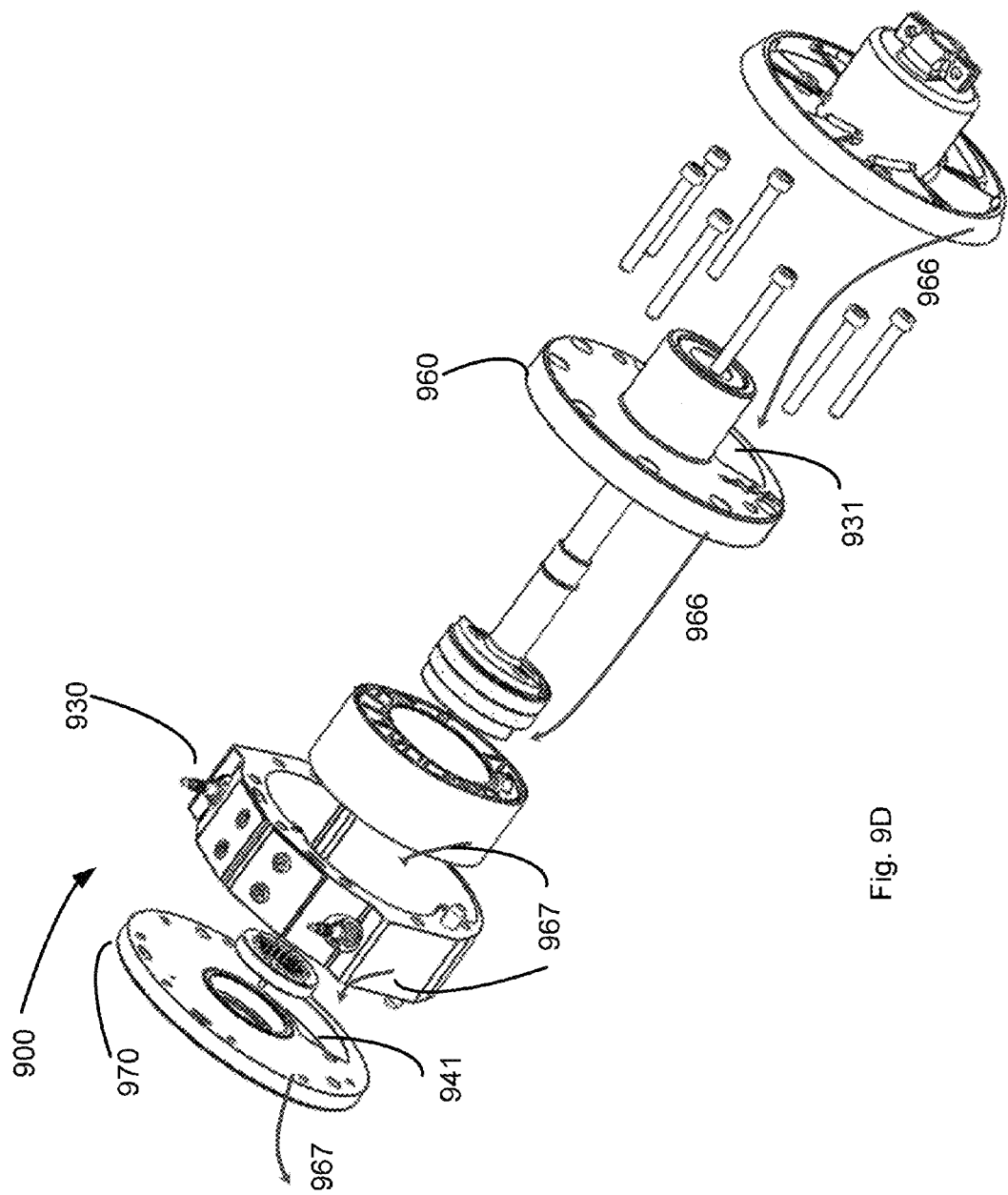

FIG. 9D schematically illustrates the air flow, or the combined air and fuel flow (for carbureted air) of engine 900. The air 966 enters through front cover 960. In FIG. 9D, cover 960 is similar to front cover 930, but has only a single intake aperture 931, and back cover 970 is similar to the cover 940, but has only a single exit aperture 941. The fresh air 966 passes through the rotor 910 (e.g., through conduits 570) to cool the rotor and exits the engine 900 through exit aperture 941. Some of the fresh air 966 passes through the exhaust pocket, or conduit, 570E, and mixes with byproducts of combustion to form exhaust gas 967 prior to exiting the engine 900 through exit aperture 941.

The engine 900 may be configured to intake of air for combustion in several ways. In some embodiments, fresh air enters through an aperture 570D of the rotor 910 and then passes through a reed valve 917 into a working chamber via rotor intake port 915. Fuel may be provided into the working chamber by a fuel injector (e.g., fuel injector 200 or 539A or 539B, for example) or via a carburetor such as carburetor 580 for example.

Alternate embodiments include a fuel injector (e.g., 539A) configured to inject fuel into the air 966 before it passes through aperture 931. Some of the fuel injected into the air 966 will travel with the air 966 as it passes through the rotor and intake aperture 915 into a working chamber, and some of the fuel will pass through the housing 930 and be reclaims from the air, for example by a cyclone separator.

Figure 10:
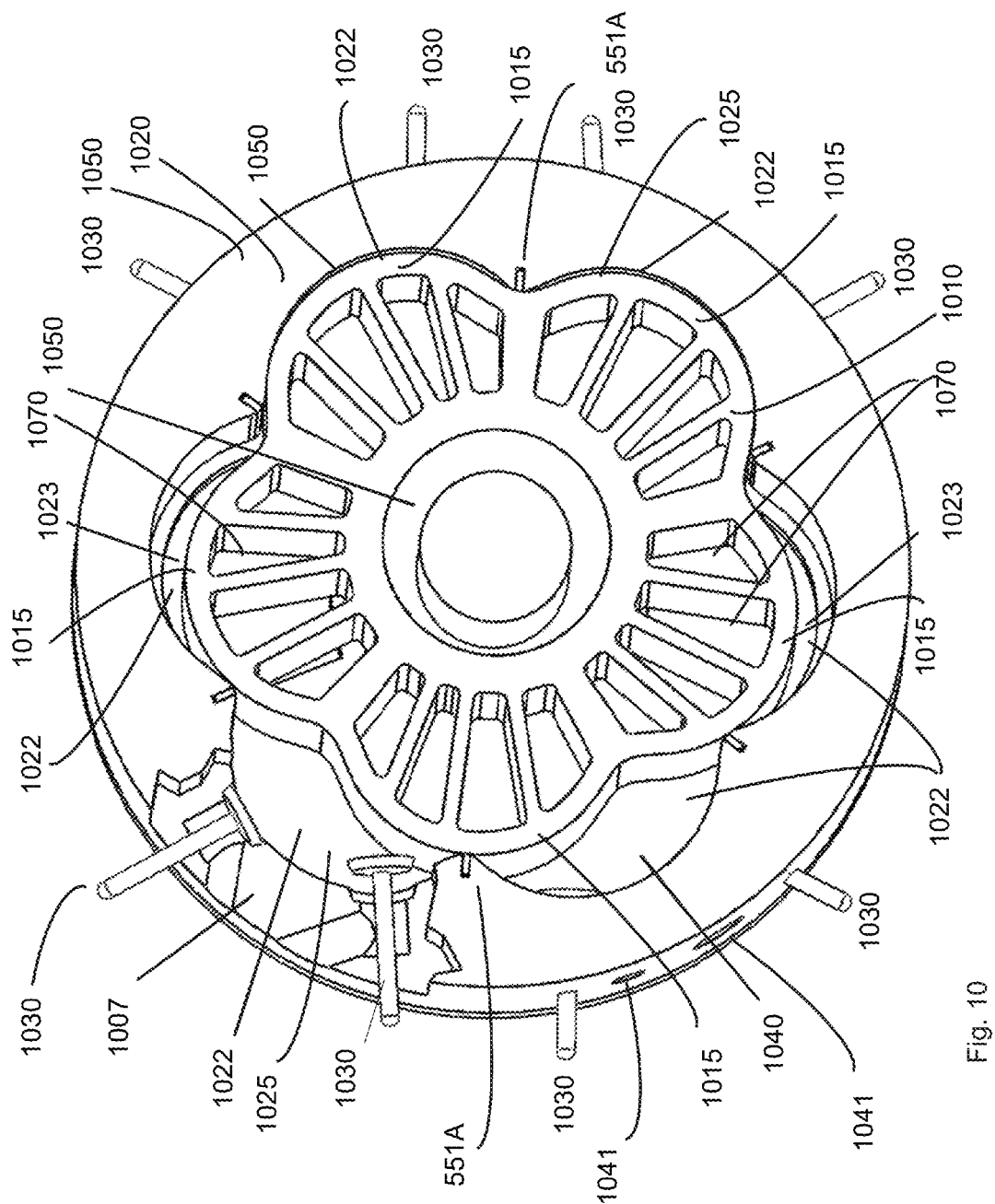
FIG. 10 schematically illustrates another embodiment of a rotor and housing of a rotary engine.

FIG. 10 schematically illustrates an alternate embodiment of a rotor 1010 and housing 1020. In this embodiment, the rotor 1010 has 5 lobes 1015 and the housing 1020 has 6 lobe-receiving regions 1022. As such, in this embodiment "N" equals 5 and "N+1" equals 6. The housing 1020 also has two sides, 930 and 940, as described an illustrated above in connection with FIGS. 9A-9D.

The housing 1020 includes a number of lobe-receiving regions 1022 that have valve assemblies 1030 for intake of air and exhaust of byproducts of combustion, or intake of working fluids (gas or liquids) at low pressure and exhaust (or expulsion) of pressurized fluids. Area 1007 schematically illustrates a cut-out to show the valve assemblies 1030. As such, these lobe-receiving regions 1022 form working chambers 1025 with the lobes.

The housing 1020 also includes two lobe receiving regions 1022 that form cooling chambers 1023. These lobe receiving regions 1022 do not form working chambers with the lobes. Rather, these lobe receiving regions 1022 allow the flow of cooling air through the housing 1020 and through the lobes, and/or through apertures 1070 in the lobes, as described in connecting with other embodiments.

The housing 1020 also includes one lobe receiving region 1022 that forms, along with the lobes 1015 and sides (e.g., 930, 940) of the housing 1020, an air compressor chamber 1040. The sides 930, 940 do not include apertures adjacent to the lobe-receiving regions 1022 that form the air compressor chamber 1040. To that end, the housing 1020 includes air compressor conduits 1041 in fluid communication with the air compressor chamber 1040 to conduct air into and out of the air compressor chamber 1040.

The housing 1020 also includes one lobe receiving region 1022 that forms, along with the lobes 1015 and sides (e.g., 930, 940) of the housing 1020, a water pump chamber 1050. The sides 930, 940 do not include apertures adjacent to the lobe-receiving regions 1022 that form the water pump chamber 1050. To that end, the housing 1020 includes water conduits (similar to compressor conduits 1041, but not visible from the perspective of FIG. 10) in fluid communication with the water pump chamber 1050 to conduct water into and out of the water pump chamber 1050.

As such, this embodiment discloses a configuration of a housing 1020 in relation to a rotor 1010 configured so as to establish at least one chamber dedicated solely to cooling the rotor, and to establish at least one chamber dedicated solely to compressing (air), and to establish at least one chamber dedicated solely to pumping (liquid). Such an embodiment may have any one or more of such functional chambers (e.g., cooling chamber, pumping chamber, compressing chamber), and need not have all of them. Indeed, some embodiments may have any combination of any of the foregoing.

In any of the foregoing embodiments, the engine (e.g., 100, 500, 900) may be configured such that the aggregate volume of all of the chambers configured to handle, in succession, intake, compression, combustion, expansion, and exhaust phases is less than 500 cc.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An improved rotary engine having a rotor having N lobes, an intake port, an exhaust port, and a housing with respect to which the rotor is mounted for rotational motion relative to the housing, the housing having N+1 lobe-receiving regions and (i) a peak disposed between each pair of adjacent N+1 lobe-receiving regions and (ii) a pair of sides, the N+1 lobe-receiving regions further configured in relation to the rotor to successively receive the N lobes as the rotor rotates relative to the housing, so as to establish chambers associated with each one of the N+1 lobe-receiving regions, wherein at least one chamber of the established chambers is configured to handle, in succession, intake, compression, combustion, expansion, and exhaust phases, wherein the improvement comprises:

configuration of the housing in relation to the rotor so that at least one chamber of the established chambers, other than the at least one chamber configured to handle intake, compression, combustion, expansion, and exhaust phases, is dedicated to a single function selected from the group consisting of cooling, compressing, and pumping.

2. The engine according to claim 1, further comprising a removably attachable cartridge, containing fuel, in communication with a fuel intake port configured to deliver the fuel to at least one of the N+1 lobe-receiving regions.

3. The engine according to claim 1, wherein the at least one chamber dedicated to a single function selected from the group consisting of cooling, compressing, and pumping is dedicated to cooling, and the at least one chamber is a cooling chamber.

4. The engine according to claim 3, wherein the cooling chamber is configured to receive flow of a cooling medium therethrough that also comes into contact with the rotor so as to cool the rotor.

5. The engine according to claim 4, wherein rotation of the rotor around an axis defines an axial direction, and the cooling chamber is configured to receive axial flow of the cooling medium therethrough.

6. The engine according to claim 4, wherein rotation of the rotor around an axis defines an axial direction, and the rotor includes at least one channel therethrough to receive flow of the cooling medium.

7. The engine according to claim 6, wherein the cooling chamber is configured to receive axial flow of the cooling medium therethrough and the at least one channel of the rotor is disposed axially.

8. The engine according to claim 7, wherein the rotor has a plurality of axial channels separated from one another by ribs.

9. The engine according to claim 8, wherein the ribs are angled so as to serve as fan blades to pump the cooling medium through the cooling chamber.

10. The engine according to claim 8, wherein the cooling medium is air and an aggregate volume of all of the established chambers configured to handle, in succession, intake, compression, combustion, expansion, and exhaust phases is less than 500 cc.

11. The engine according to claim 1, wherein the at least one chamber that is configured to handle intake, compression, combustion, expansion and exhaust phases has a chamber volume, the chamber volume at the end of the expansion phase is larger than the chamber volume at the start of the compression phase.

12. The engine according to claim 1, wherein the at least one chamber that is configured to handle intake, compression, combustion, expansion and exhaust phases has a chamber pressure at the end of the expansion phase that is approximately 1 atmosphere.

13. The engine according to claim 1 wherein the rotor is rotatably coupled to a drive shaft, the engine further comprising counterweights disposed within the rotor but coupled to the drive shaft so as to turn with the drive shaft and to counterbalance the rotor.

14. The engine according to claim 1, wherein the at least one chamber dedicated to a single function selected from the group consisting of cooling, compressing, and pumping is dedicated to compressing.

15. The engine according to claim 1, wherein the at least one chamber dedicated to a single function selected from the group consisting of cooling, compressing, and pumping is dedicated to pumping.

* * * * *